US010393256B2

(12) United States Patent
Yuasa

(10) Patent No.: US 10,393,256 B2
(45) Date of Patent: Aug. 27, 2019

(54) CONTROL DEVICE FOR VEHICLE DRIVE APPARATUS

(71) Applicant: AISIN AW CO., LTD., Anjo-shi, Aichi-ken (JP)

(72) Inventor: Yuto Yuasa, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 106 days.

(21) Appl. No.: 15/547,712

(22) PCT Filed: Mar. 30, 2016

(86) PCT No.: PCT/JP2016/060469
§ 371 (c)(1),
(2) Date: Jul. 31, 2017

(87) PCT Pub. No.: WO2016/159124
PCT Pub. Date: Oct. 6, 2016

(65) Prior Publication Data

US 2018/0010685 A1 Jan. 11, 2018

(30) Foreign Application Priority Data

Mar. 30, 2015 (JP) ................................ 2015-070018

(51) Int. Cl.
*F16H 61/12* (2010.01)
*F16H 61/16* (2006.01)
(Continued)

(52) U.S. Cl.
CPC ............ *F16H 61/12* (2013.01); *F16H 61/16* (2013.01); *B60W 50/0205* (2013.01);
(Continued)

(58) Field of Classification Search
CPC .. F16H 61/12; F16H 61/16; F16H 2061/1224; F16H 2061/1232;
(Continued)

(56) References Cited

U.S. PATENT DOCUMENTS

| | | | | |
|---|---|---|---|---|
| 5,609,067 A * | 3/1997 | Mitchell | F16H 61/12 192/3.63 |
| 8,224,542 B2 * | 7/2012 | Nagashima | F16H 61/12 477/107 |

(Continued)

FOREIGN PATENT DOCUMENTS

| | | |
|---|---|---|
| JP | H03-213769 A | 9/1991 |
| JP | 2010-223399 A | 10/2010 |
| JP | 2013-170626 A | 9/2013 |

OTHER PUBLICATIONS

Jun. 28, 2016 Search Report issued in International Patent Application No. PCT/JP2016/060469.

*Primary Examiner* — Roger L Pang
(74) *Attorney, Agent, or Firm* — Oliff PLC

(57) ABSTRACT

Desired is a control device for a vehicle drive apparatus capable of determining an engagement failure in an engagement device when shifting a transmission device to a neutral state and making the rotational speed of a driving force source reduced. In order to shift a transmission device from a state in which an object shift speed is established and the vehicle is traveling to a neutral state in which no shift speed is established in the transmission device (#02), when an object engagement device is disengaged while maintaining engagement of a non-object engagement device and the rotational speed of a driving force source (#04, #06) is made to be reduced, an engagement failure in the object engagement device (#02, #07) is determined based on a change in the rotational speed of an input member.

15 Claims, 7 Drawing Sheets

(51) Int. Cl.

| | |
|---|---|
| *B60W 50/02* | (2012.01) |
| *B60W 50/035* | (2012.01) |
| *F16H 3/66* | (2006.01) |
| *F16H 61/682* | (2006.01) |
| *F16H 61/00* | (2006.01) |
| *F16H 61/686* | (2006.01) |

(52) U.S. Cl.

CPC ..... *B60W 50/035* (2013.01); *B60W 2510/104* (2013.01); *B60W 2510/1015* (2013.01); *B60W 2710/1005* (2013.01); *F16H 3/663* (2013.01); *F16H 61/682* (2013.01); *F16H 61/686* (2013.01); *F16H 2061/0087* (2013.01); *F16H 2061/1224* (2013.01); *F16H 2061/1232* (2013.01); *F16H 2061/1264* (2013.01); *F16H 2061/1272* (2013.01); *F16H 2061/1276* (2013.01); *F16H 2200/0052* (2013.01); *F16H 2200/201* (2013.01); *F16H 2200/2025* (2013.01); *F16H 2200/2043* (2013.01); *F16H 2200/2066* (2013.01); *F16H 2200/2082* (2013.01)

(58) Field of Classification Search

CPC .... F16H 2061/1276; F16H 2061/1264; B60W 50/0205; B60W 50/035; B60W 2710/1005; B60W 2510/1015; B60W 2510/104

USPC ............................................ 477/906; 701/62

See application file for complete search history.

(56) References Cited

U.S. PATENT DOCUMENTS

| | | | | |
|---|---|---|---|---|
| 8,725,343 | B2 * | 5/2014 | Shimizu .................. | F16H 61/12<br>477/96 |
| 8,751,122 | B2 * | 6/2014 | Arnold ................ | B60W 10/023<br>701/62 |
| 9,889,840 | B2 * | 2/2018 | Jeong .............. | B60W 30/18054 |
| 2010/0250075 | A1 | 9/2010 | Suzuki et al. | |
| 2015/0307101 | A1 * | 10/2015 | Ries ........................ | F16H 61/16<br>192/219 |
| 2017/0268667 | A1 * | 9/2017 | Tachibanada ........... | F16H 61/12 |

* cited by examiner

FIG. 4

| | C1 | C2 | C3 | B1 | B2 | F |
|---|---|---|---|---|---|---|
| 1st | ○ | | | | (○) | △ |
| 2nd | ○ | | | ○ | | |
| 3rd | ○ | | ○ | | | |
| 4th | ○ | ○ | | | | |
| 5th | | ○ | ○ | | | |
| 6th | | ○ | | ○ | | |
| Rev | | | ○ | | ○ | |

CONTROL DEVICE FOR VEHICLE DRIVE APPARATUS

TECHNICAL FIELD

The disclosure relates to a control device for a vehicle drive apparatus including, on a power transmission path connecting an input member drivingly coupled to a driving force source and an output member drivingly coupled to wheels, a transmission device that includes a plurality of engagement devices and establishes a plurality of shift speeds with different speed ratios in accordance with the state of engagement of the plurality of engagement devices.

BACKGROUND ART

In connection with the control device described above, a technique described in Patent Document 1 has been known, for example. According to the technique of Patent Document 1, when shifting a transmission device from a state in which a shift speed is established to a neutral state in which no shift speed is established, and stopping an internal combustion engine, all the engagement devices of the transmission device are controlled to be in a disengaged state. Further, according to the technique of Patent Document 1, when a restart of the internal combustion engine is requested after the shift to the neutral state, a shift speed is established by engaging the engagement devices.

PRIOR ART DOCUMENT

Patent Document

Patent Document 1: Japanese Patent Application Publication No. 2010-223399

SUMMARY

Problem to be Solved

However, according to the technique of Patent Document 1, if there is an engagement failure in an engagement device having been in an engaged state when the internal combustion engine is stopped, an unintended shift speed might be established when the internal combustion engine is restarted. Further, in the next establishment of a shift speed, if the shift speed is established after performing engagement failure determination, it takes time to establish the shift speed.

Therefore, there is a demand for a control device for a vehicle drive apparatus capable of determining an engagement failure without increasing the time needed for the next establishment of a shift speed.

Means for Solving the Problem

In view of the above, there is provided a control device for a vehicle drive apparatus, the vehicle drive apparatus including, on a power transmission path connecting an input member drivingly coupled to a driving force source and an output member drivingly coupled to wheels, a transmission device that includes a plurality of engagement devices and establishes a plurality of shift speeds with different speed ratios in accordance with a state of engagement of the plurality of engagement devices. The control device for a vehicle drive apparatus is characterized in that in order to shift the transmission device from a state in which an object shift speed is established and a vehicle is traveling to a neutral state in which no shift speed is established in the transmission device, the object shift speed being a shift speed established by engagement of an object engagement device that is one of the plurality of engagement devices and a non-object engagement device that is another one or more of the plurality of engagement devices, when the object engagement device is disengaged while maintaining engagement of the non-object engagement device and a rotational speed of the driving force source is made to be reduced, an engagement failure in the object engagement device is determined based on a change in a rotational speed of the input member.

According to the above characteristic configuration, it is possible to determine an engagement failure in the object engagement device, using the opportunity of shifting the transmission device to the neutral state during travel of the vehicle. Therefore, it is possible to determine an engagement failure without increasing the time needed for the next establishment of a shift speed. More specifically, the object engagement device is disengaged while maintaining engagement of the non-object engagement device and the rotational speed of the driving force source is made to be reduced. Therefore, if there is no engagement failure in the object engagement device, the object engagement device is disengaged; the transmission device is shifted from a state in which the object shift speed is established to the neutral state; and the rotational speed of the input member decreases as the rotational speed of the driving force source decreases. On the other hand, if there is an engagement failure in the object engagement device, the object engagement device is not actually disengaged; the transmission device is not shifted to the neutral state; and the rotational speed of the input member is maintained without decreasing. Accordingly, since the behavior of the rotational speed of the input member varies depending on whether there is an engagement failure in the object engagement device, it is possible to determine an engagement failure in the object engagement device based on a change in the rotational speed of the input member. Further, according to this characteristic configuration, since it is possible to perform failure determination when shifting from the state in which a shift speed is established to the neutral state, it is easy to prevent an unintended shift speed from being established in the next establishment of a shift speed.

BRIEF DESCRIPTION OF THE DRAWINGS

FIG. 4 is an operation table for a transmission device according to a preferred embodiment.

DETAILED DESCRIPTION

1. Embodiment

A control device 30 for controlling a vehicle drive apparatus 1 according to an embodiment will be described with reference to the drawings.

Figure 1:
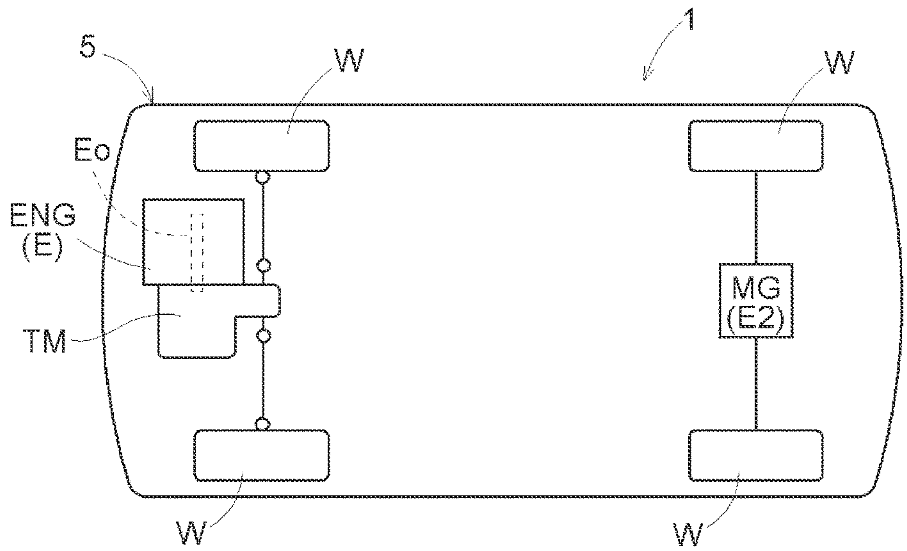
FIG. 1 is a schematic diagram illustrating the general configuration of a vehicle according to a preferred embodiment.
Figure 2:
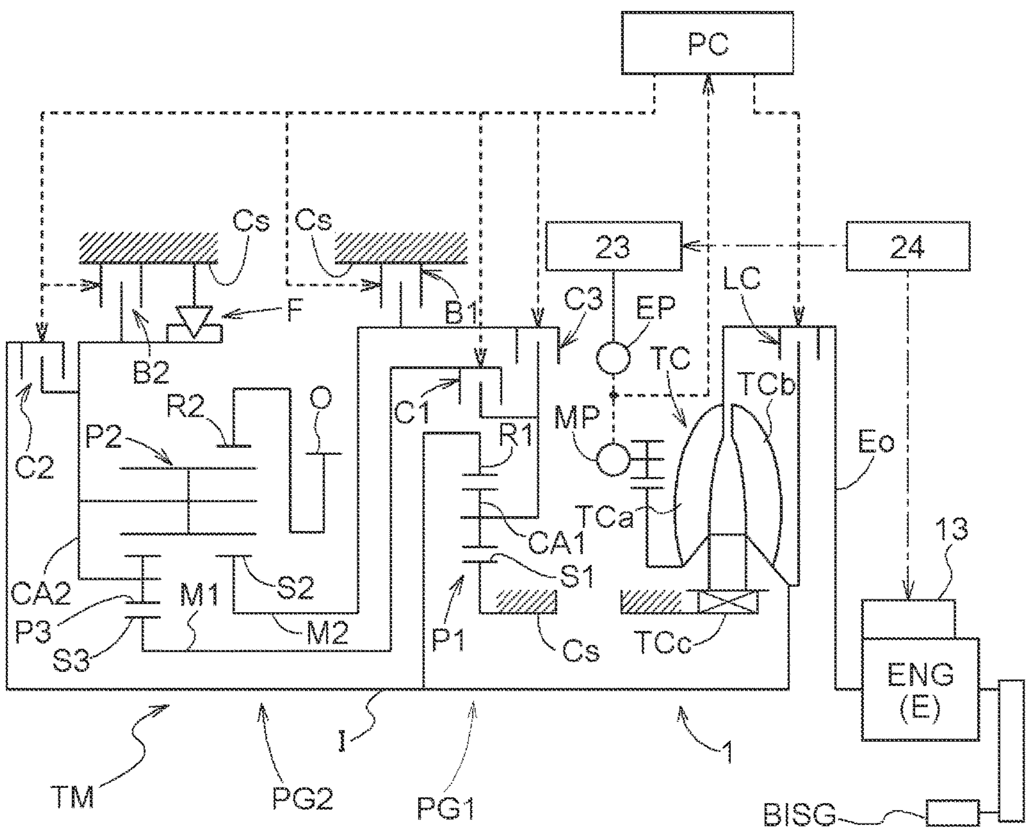
FIG. 2 is a skeleton diagram of a vehicle drive apparatus according to a preferred embodiment.

The vehicle drive apparatus 1 includes, on a power transmission path connecting an input member I drivingly coupled to a driving force source E and an output member O drivingly coupled to wheels W, a transmission device TM that includes a plurality of engagement devices C1, B1, . . . , and establishes a plurality of shift speeds with different speed ratios in accordance with the state of engagement of the plurality of engagement devices C1, B1, . . . . FIGS. 1 and 2 are schematic diagrams illustrating the general configuration of the vehicle drive apparatus 1 and the control device 30 according to the embodiment. As illustrated in FIGS. 1 and 2, in the present embodiment, the driving force source E drivingly coupled to the input member I is an internal combustion engine ENG The transmission device TM transmits the rotation of the input member I to the output member O while changing the speed by switching between the speed ratios of the shift speeds.

The term "drivingly coupled" as used herein refers to a state in which two rotary elements are coupled to each other in such a manner that allows transmission of a driving force, including a state in which the two rotary elements are coupled to each other to rotate together, and a state in which the two rotary elements are coupled to each other via one or two or more transmission members in such a manner that allows transmission of a driving force. Examples of such transmission members include various members that transmit rotation while maintaining the same speed or changing the speed, such as a shaft, a gear mechanism, a belt, and a chain. Examples of such transmission members may further include an engagement device that selectively transmits rotation and a driving force, such as a friction engagement device and a meshing type engagement device.

In the present embodiment, the vehicle drive apparatus I includes a rotary electric machine MG as a secondary driving force source E2 that is drivingly coupled to wheels W without the input member I or the transmission device TM interposed therebetween. The rotary electric machine MG is drivingly, coupled to the wheels W (in this example, rear wheels) different from the wheels W (in this example, front wheels) to which the output member O is drivingly coupled. Further, in the present embodiment, the internal combustion engine ENG is drivingly coupled to the input member I via a torque converter TC. In the present embodiment, the internal combustion engine ENG is not included in the vehicle drive apparatus 1.

Figure 3:
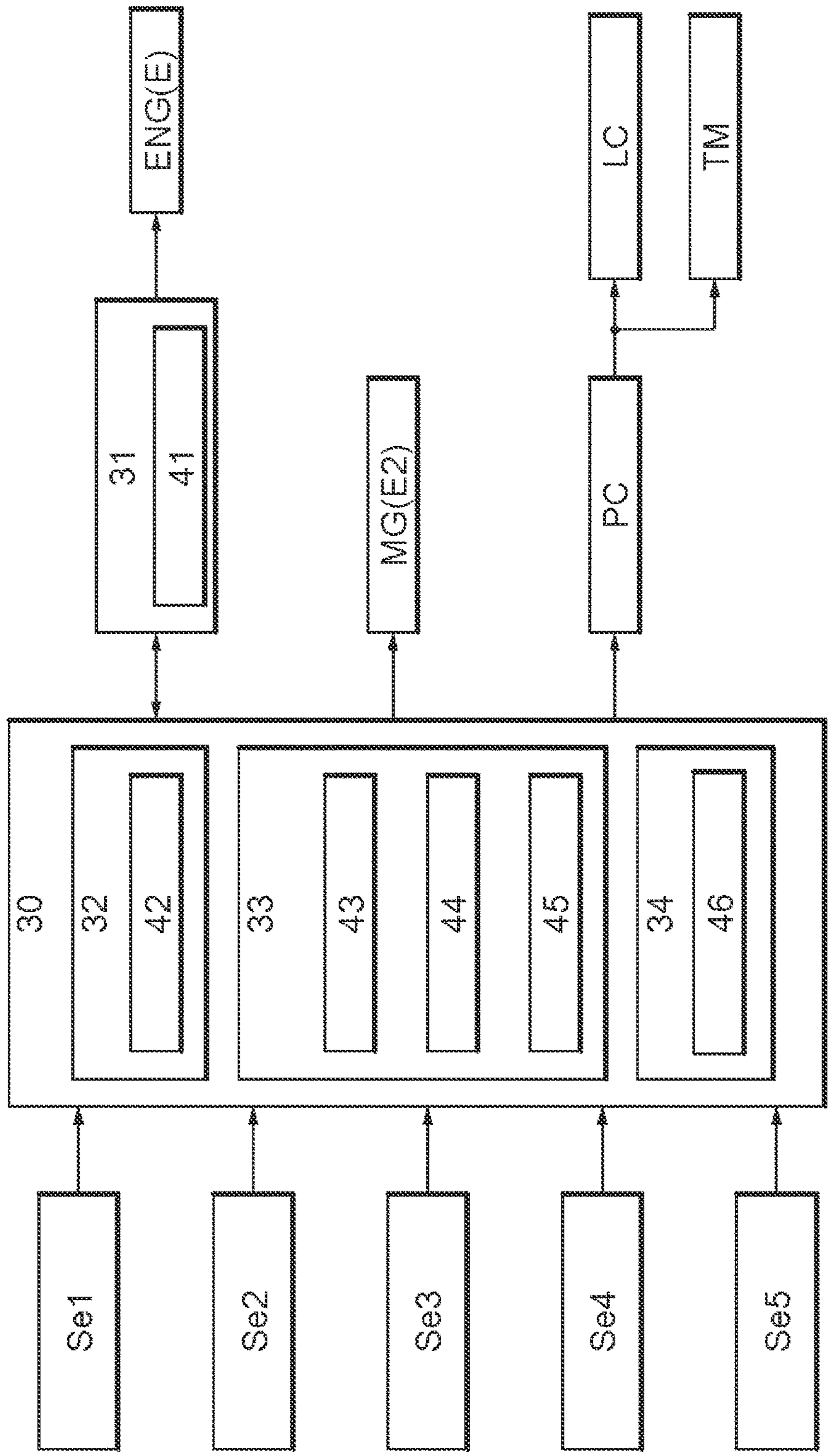
FIG. 3 is a schematic diagram illustrating the general configuration of the vehicle drive apparatus and a control device according to a preferred embodiment.

A vehicle 5 is provided with the control device 30 for controlling the vehicle drive apparatus 1, In the present embodiment, as illustrated in FIG. 3, the control device 30 includes a rotary electric machine control unit 32 that controls the rotary electric machine MG, a power transmission control unit 33 that controls the transmission device TM and a lock-up clutch LC, and a vehicle control unit 34 that controls the vehicle drive apparatus 1 by organizing these control units. The vehicle 5 is also provided with an internal combustion engine control device 31 that controls the internal combustion engine ENG.

The control device 30 according to the present embodiment having the configuration described above includes an engagement failure determination section 44 as illustrated in FIG. 3.

When shifting the transmission device TM from a state in which an object shift speed, which is a shift speed established by engagement of an object engagement device that is one of the plurality of engagement devices C1, B1, . . . and a non-object engagement device that is another one or more of the plurality of engagement devices C1, B1, . . . , is established and the vehicle is traveling to the neutral state in which no shift speed is established in the transmission device TM, and making a rotational speed ωe of the internal combustion engine ENG reduced, the engagement failure determination section 44 issues a command to disengage the object engagement device and a command to maintain engagement of the non-object engagement device, and then determines an engagement failure in the object engagement device based on a change in a rotational speed ωi of the input member I. That is, in order to shift the transmission device TM from a state in Which the object shift speed is established and the vehicle is traveling to the neutral state in which no shift speed is established in the transmission device TM, when the object engagement device is disengaged while maintaining engagement of the non-object engagement device and the rotational speed ωe of the internal combustion engine ENG is made to be reduced, the engagement failure determination section 44 determines an engagement failure in the object engagement device based on a change in the rotational speed ωi of the input member I. Note that the expression "the vehicle is traveling" indicates a state in which the wheels W are rotating. Similarly, in the following description, the expression "the wheels W are rotating" indicates a state in which the vehicle is traveling.

1-1. Configuration of Vehicle Drive Apparatus 1

First, the configuration of the vehicle drive apparatus 1 according to a preferred embodiment will be described. FIG. 2 is a schematic diagram illustrating the configuration of a drive transmission system and a hydraulic pressure supply system of the vehicle drive apparatus I according to a preferred embodiment. Note that in FIG. 2, a part of the axisymmetric configuration is omitted. In FIG. 2, the solid line indicates the transmission path of driving force; the dash line indicates the supply path of hydraulic oil; and the one-dot chain line indicates the supply path of electricity. As illustrated in FIG. 2, the vehicle drive apparatus 1 is configured to transfer, to the output member O, the rotational driving force of the internal combustion engine ENG that is drivingly coupled to the input member I via the torque converter TC, while changing the speed by using the transmission device TM.

The internal combustion engine ENG is a heat engine driven by combustion of fuel. The internal combustion engine ENG may be any known type of internal combustion engine such as, for example, a gasoline internal combustion engine and a diesel internal combustion engine. In this example, an internal combustion engine output shaft Eo, such as a crankshaft, of the internal combustion engine ENG is drivingly coupled to the input member I via the torque converter TC.

The torque converter TC is a power transmission device that transfers the driving force via hydraulic oil contained therein, between a pump impeller TCa drivingly coupled to the internal combustion engine output shaft Eo and a turbine runner TCb drivingly coupled to the input member I. The torque converter TC includes a stator TCc provided with a one-way clutch, between the pump impeller TCa and the turbine runner TCb. The torque converter TC also includes the lock-up clutch LC that couples the pump impeller TCa and the turbine runner TCb for integral rotation. A mechanical oil pump MP is drivingly coupled to the pump impeller TCa so as to rotate together.

In the present embodiment, a starter 13 is provided adjacent to the internal combustion engine ENG. The starter 13 includes a direct-current motor, and is electrically connected to a battery 24. The starter 13 is configured to be driven by electricity supplied from the battery 24 when the internal combustion engine ENG is stopped, so as to rotate the internal combustion engine output shaft Eo and start the internal combustion engine ENG.

Further, a starter generator BISG is provided adjacent to the internal combustion engine ENG. The starter generator BISG is drivingly coupled to the internal combustion engine output shaft Eo via a pulley and so on, and has the function of a motor (an electric motor) that is supplied with electricity to generate motive power, in addition to the function of a generator (an electric generator) that generates electricity using the rotational driving force of the internal combustion engine ENG. Although the starter generator BISG has the function of an electric generator, the starter generator BISG may be configured not to have the function of an electric motor.

The transmission device TM is drivingly coupled to the input member I to which the driving force source E is drivingly coupled. In the present embodiment, the transmission device TM is a stepped automatic transmission device that provides a plurality of shift speeds with different speed ratios (gear ratios). In order to establish the plurality of shift speeds, the transmission device TM includes a gear mechanism such as a planetary gear mechanism and the plurality of engagement devices C1, B1, . . . . The transmission device TM changes the rotational speed ωi of the input member I by switching between the speed ratios of the shift speeds, converts the torque, and transfers the torque to the output member O. The torque transferred from the transmission device TM to the output member O is transferred to the two right and left wheels W via a differential gear device. Here, the speed ratio (gear ratio) refers to the ratio of the rotational speed ωi of the input member I to the rotational speed of the output member O in the case where each shift speed is established in the transmission device TM. In the present disclosure, the speed ratio is the value obtained by dividing the rotational speed ωi of the input member I by the rotational speed of the output member O. That is, the rotational speed obtained by dividing the rotational speed ωi of the input member I by the speed ratio is the rotational speed of the output member O. Further, the torque obtained by multiplying the torque transferred from the input member I to the transmission device TM by the speed ratio is the torque transferred from the transmission device TM to the output member O.

In the present embodiment, as illustrated in an operation table of FIG. 4, the transmission device TM provides six shift speeds (first speed "1st", second speed "2nd", third speed "3rd", fourth speed "4th", fifth speed "5th"., and sixth speed "6th") with different speed ratios (reduction ratios) as forward speeds. In order to establish these shift speeds, the transmission device TM includes a gear mechanism having a first planetary gear mechanism PG1 and a second planetary gear mechanism PG2, and six engagement devices C1, C2, C3, B1, B2, and F. The engagement and disengagement of the plurality of engagement devices C1, B1, . . . excluding the one-way clutch F are controlled to change a rotation state of each rotary element of the first planetary gear mechanism PG1 and the second planetary gear mechanism PG2. The plurality of engagement devices C1, B1, . . . are selectively engaged, thereby switching between the six shift speeds. The transmission device TM includes one reverse speed Rev in addition to the six shift speeds described above.

Referring to FIG. 4, the symbol "○" indicates that the engagement device is in the engaged state. The blank indicates that the engagement device is in the disengaged state. The symbol "(○)" indicates that the engagement device is placed in the engaged state in cases such as when applying an engine brake. The symbol "Δ" indicates that the engagement device is placed in the disengaged state when rotating in one direction, and placed in the engaged state when rotating in the other direction.

The first speed (1st) is established by engaging the first clutch C1 and the one-way clutch F. In cases such as when applying an engine brake, the first speed is established by engaging the first clutch C1 and the second brake B2. The second speed (2nd) is established by engaging the first clutch C1 and the first brake B1. The third speed (3rd) is established by engaging the first clutch C1 and the third clutch C3. The fourth speed (4th) is established by engaging the first clutch C1 and the second clutch C2. The fifth speed (5th) is established by engaging the second clutch C2 and the third clutch C3. The sixth speed (6th) is established by engaging the second clutch C2 and the first brake B1. The reverse speed (Rev) is established by engaging the third clutch C3 and the second brake B2, These shift speeds include the first speed, the second speed, the third speed, the fourth speed, the fifth speed, and the sixth speed in descending order of the speed ratio (reduction ratio) between the input member I (internal combustion engine ENG) and the output member O.

As illustrated in FIG. 2, the first planetary gear mechanism PG1 is a single-pinion type planetary gear mechanism having three rotary elements: a carrier CA1 that supports a plurality of pinion gears P1; and a sun gear S1 and a ring gear R1 each of which meshes with the pinion gears P1. The second planetary gear mechanism PG2 is a Ravigneaux type planetary gear mechanism having four rotary elements: two sun gears, namely, a first sun gear S2 and a second sun gear S3; a ring gear R2; and a common carrier CA2 supporting a long pinion gear P2 that meshes with both the first sun gear S2 and the ring gear R2 and a short pinion gear P3 that meshes with the long pinion gear P2 and the second sun gear S3.

The sun gear S1 of the first planetary gear mechanism PG1 is fixed to a case Cs serving as a non-rotary member. The carrier CA1 is selectively drivingly coupled by the third clutch C3 to the second sun gear S3 of the second planetary gear mechanism PG2 to rotate therewith. The carrier CA1 is also selectively drivingly coupled by the first clutch C1 to the first sun gear S2 of the second planetary gear mechanism PG2 to rotate therewith. The carrier CA1 is selectively fixed to the case Cs by the first brake B1. The ring gear R1 is drivingly coupled to the input member I to rotate therewith.

The first sun gear S2 of the second planetary gear mechanism PG2 is selectively drivingly coupled by the first clutch C1 to the carrier CA1 of the first planetary gear mechanism PG1 to rotate therewith. The carrier CA2 is selectively drivingly coupled by the second clutch C2 to the input member I to rotate therewith. The common carrier CA2 is selectively fixed to the case Cs serving as a non-rotary member by the second brake B2 or the one-way clutch F. The one-way clutch F selectively fixes the carrier CA2 to the case Cs by preventing rotation in only one direction. The ring gear R2 is drivingly coupled to the output member O to rotate therewith. The second sun gear S3 is selectively drivingly coupled by the third clutch C3 to the carrier CA1 of the first planetary gear mechanism PG1 to rotate therewith. The second sun gear S3 is selectively fixed to the case Cs by the first brake B1.

In the present embodiment, the plurality of the engagement devices C1, C2, C3, B1, and B2 except the one-way clutch F included in the transmission device TM are friction engagement devices. More specifically, these engagement devices are multi-plate clutches and multi-plate brakes that are operated by hydraulic pressure. The state of engagement of these engagement devices C1, C2, C3, B1, and B2 is controlled by hydraulic pressure supplied from the hydraulic control device PC. Note that the lock-up clutch LC is also a friction engagement device.

Each friction engagement device includes a pair of engagement members, and transfers torque between the engagement members by friction between the engagement members. When there is a rotational speed difference (slip) between the engagement members of the friction engagement device, the torque (slip torque) with a magnitude of the transfer torque capacity is transferred from the member with a higher rotational speed to the member with a lower rotational speed by kinetic friction. When there is no rotational speed difference (slip) between the engagement members of the friction engagement device, the friction engagement device transfers the torque acting between the engagement members of the friction engagement device by static friction, up to the magnitude of the transfer torque capacity. The term "transfer torque capacity" as used herein refers to the maximum magnitude of torque that can be transferred by friction generated by the friction engagement device. The magnitude of the transfer torque capacity changes in proportion to the engagement pressure of the friction engagement device. The engagement pressure is a pressure (or a force) that presses two engagement members (friction plates) against each other. In the present embodiment, the engagement pressure changes in proportion to the magnitude of the hydraulic pressure that is supplied. That is, in the present embodiment, the magnitude of the transfer torque capacity changes in proportion to the magnitude of the hydraulic pressure that is supplied to the friction engagement device.

Each friction engagement device includes a piston and a return spring. The piston is urged toward a disengagement side by a reaction force of the spring. When the force generated in the piston by the hydraulic pressure that is supplied to a hydraulic cylinder of the friction engagement device exceeds the reaction force of the spring, the piston exerts a pressure that presses the two engagement members against each other, so that transfer torque starts to be generated in the friction engagement device.

Thus, the friction engagement device changes from the disengaged state to the engaged state. The engagement pressure (hydraulic pressure in the present embodiment) at the time when the transfer torque starts to be generated is referred to as "torque transfer starting pressure" (so-called stroke end pressure in the present embodiment). The friction engagement device is configured such that, after the engagement pressure (hydraulic pressure) that is supplied exceeds the torque transfer starting pressure, the transfer torque capacity increases in proportion to the increase in engagement pressure (hydraulic pressure). Note that the friction engagement device may include no return spring and may be configured to control the transfer torque capacity by differential pressure generated on both sides of the piston of the hydraulic cylinder.

In the present embodiment, the engaged state indicates a state in which a transfer torque capacity is produced in the engagement device, and includes a slip engaged state and a directly engaged state. The disengaged state indicates a state in which no transfer torque capacity is produced in the engagement device. The slip engaged state indicates an engaged state in which there is a rotational speed difference (slip) between the engagement members of the engagement device. The directly engaged state indicates an engaged state in which there is no rotational speed difference (slip) between the engagement members of the engagement device. A non-directly engaged state indicates an engaged state other than the directly engaged state, and includes the disengaged state and the slip engaged state.

Note that there are cases where a transfer torque capacity is produced in the friction engagement device by dragging between the engagement members (friction members) even when a command to produce a transfer torque capacity is not issued by the control device 30. For example, there are cases where the friction members contact with each other and a transfer torque capacity is produced by dragging between the friction members even when the friction members are not pressed against each other by the piston. Thus, the "disengaged state" also includes a state in which a transfer torque capacity is produced by dragging between the friction members when a command to produce a transfer torque capacity is not issued to the friction engagement device by the control device 30.

<Rotary Electric Machine MG>

The rotary electric machine MG includes a stator fixed to a non-rotary member, and a rotor rotatably supported on the radially innerside to face the stator. The rotor of the rotary electric machine MG is drivingly coupled to the wheels W without the input member I or the transmission device TM interposed therebetween. In the present embodiment, as illustrated in FIG. 1, the rotary electric machine MG is drivingly coupled not to the front wheels to which the transmission device TM is drivingly coupled, but to the rear wheels. The rotary electric machine MG is electrically connected to a battery serving as an electricity storage device via an inverter that performs DC-AC conversion, Further, the rotary electric machine MG can serve as a motor (electric motor) that is supplied with electricity to generate motive power, and as a generator (electric generator) that is supplied with motive power to generate electricity. That is, the rotary electric machine MG is supplied with electricity from the battery via the inverter to perform power running, or generate electricity using the rotational driving force transferred from the wheels W, and the generated electricity is stored in the battery via the inverter. Here, the rotational driving force transferred from the wheels W includes the driving force of the internal combustion engine ENG transferred via the wheels W and the road surface.

1-2. Configuration of Hydraulic Control Device PC

The hydraulic control system of the vehicle drive apparatus 1 includes a hydraulic control device PC that regulates the hydraulic pressure of hydraulic oil supplied from the mechanical oil pump MP driven by the internal combustion engine ENG and an electric oil pump EP driven by a dedicated electric motor 23 to a predetermined pressure. The hydraulic control device PC includes a plurality of hydraulic control valves such as linear solenoid valves to adjust the hydraulic pressures to be supplied to the respective engagement devices C1, B1, . . . , LC, and so on. The hydraulic control valves regulate the openings of the valves in accordance with a signal value of a hydraulic pressure command supplied from the control device 30, and thereby supplies the hydraulic oil of the hydraulic pressure corresponding to the signal value to each of the engagement devices C1 , B1, . . . , LC, and so on. The signal value supplied to each linear solenoid valve from the control device 30 is a current value. The hydraulic pressure output from each linear solenoid valve is basically in proportion to the current value supplied from the control device 30.

The hydraulic control device PC regulates the openings of one or more regulating valves based on a hydraulic pressure (signal pressure) output from a hydraulic regulating linear solenoid valve, and thereby regulates the amounts of the hydraulic oil drained from the regulating valves to regulate the hydraulic pressures of the hydraulic oil to one or more predetermined pressures. The hydraulic oil regulated to the predetermined pressures is supplied to the plurality of engagement devices C1, B1, . . . , the lock-up clutch LC, and so on included in the transmission device TM at hydraulic pressures of the respective required levels.

1-3. Configuration of Control Device 30

Next, the configuration of the control device 30 that controls the vehicle drive apparatus 1 and the internal combustion engine control device 31 will be described with reference to FIG. 3.

The control units 32 to 34 of the control device 30 and the engine control device 31 each include an arithmetic processing unit such as a CPU serving as a core member, a storage device such as a RAM (random access memory) configured to read and write data from and to the arithmetic processing unit and a ROM (read only memory) configured to read data from the arithmetic processing unit. Functional sections 41 to 46 and so on of the control device 30 are formed by software (program) stored in the ROM of the control device or the like, hardware such as a separately provided arithmetic circuit, or a combination of both. The control units 32 to 34 of the control device 30 and the internal combustion engine control device 31 are configured to communicate with each other, share various types of information such as detection information of sensors and control parameters, and perform cooperative control, thereby implementing the functions of the functional sections 41 to 46.

The vehicle drive apparatus 1 includes sensors such as sensors Se1 to Se5. Electric signals output from the sensors are input to the control device 30 and the internal combustion engine control device 31. The control device 30 and the internal combustion engine control device 31 calculate the detection information of the sensors based on the input electric signals.

The input rotational speed sensor Se1 is a sensor that detects the rotational speed ωi of the input member I. The control device 30 detects the rotational speed ωi (angular velocity) of the input member I based on a signal input from the input rotational speed sensor Se1. The output rotational speed sensor Se2 is a sensor that detects the rotational speed of the output member O. The control device 30 detects the rotational speed (angular velocity) of the output member O based on a signal input from the output rotational speed sensor Se2. The rotational speed of the output member O is proportional to the vehicle speed. Therefore, the control device 30 calculates the vehicle speed based on the signal input from the output rotational speed sensor Se2. The engine rotational speed sensor Se3 is a sensor that detects the rotational speed of the internal combustion engine output shaft Eo (internal combustion engine ENG). The internal combustion engine control device 31 detects the rotational speed ωe (angular velocity) of the internal combustion engine ENG based on a signal input from the engine rotational speed sensor Se3.

The shift position sensor Se4 is a sensor that detects the selected position (shift position) of a shift lever operated by the driver. The control device 30 detects the shift position based on a signal input from the shift position sensor Se4. The shift lever can select a parking position (P position), a reverse position (R position), a neutral position (N position), and a forward position (D position). The shift lever can also select shift speed limiting positions, such as the "2 position" and the "L position", that limit the range of the forward shift speed to be established. Further, the shift lever is configured such that an "upshift request switch" for requesting the transmission device TM for an upshift and a "downshift request switch" for requesting for a downshift can be operated when the D position is selected.

The accelerator operation amount sensor Se5 is a sensor that detects the amount of operation of an accelerator pedal. The control device 30 detects the accelerator operation amount based on a signal input from the accelerator operation amount sensor Se5.

1-3-1. Vehicle Control Unit 34

The vehicle control unit 34 includes the integrated control section 46. The integrated control section 46 integrally controls, over the entire vehicle, various types of torque control performed on the internal combustion engine ENG the rotary electric machine MG, the transmission device TM, the lock-up clutch LC, and so on, and engagement control performed on the engagement devices.

The integrated control section 46 calculates required vehicle torque, which is torque required for driving the wheels W and is a target driving force to be transferred from the driving force source E and the secondary driving force source E2 to the wheels W, and determines the operation mode of the internal combustion engine ENG and the rotary electric machine MG, in accordance with the accelerator operation amount, the vehicle speed, the charge amount of the battery, and so on. The operation mode includes an electric mode for traveling with only the driving force of the rotary electric machine MG, and a parallel mode for traveling with at least the driving force of the internal combustion. engine ENG. For example, when the accelerator operation amount is small and the charge amount of the battery is large, the electric mode is determined as the operation mode. In other cases, that is, when the accelerator operation amount is large or the charge amount of the battery is small, the parallel mode is .determined as the operation mode.

The integrated control section 46 calculates required internal combustion engine torque, which is the required output torque of the internal combustion engine ENG, required rotary electric machine torque, which is the required output torque of the rotary electric machine MG, a hydraulic pressure command, which is a target of a hydraulic pressure to be supplied to the lock-up clutch LC, and a target shift speed of the transmission device TM, based on the required vehicle torque, the operation mode, the charge amount of the battery, and so on. Then, the integrated control section 46 performs integrated control by transmitting commands indicating the calculation results to the other control units 32 and 33 and the internal combustion engine control device 31, The required internal combustion engine torque is proportional to the accelerator operation amount under conditions where the parameters other than the accelerator operation amount, that is, the vehicle speed, the charge amount of the battery; and so on do not change, in the parallel mode.

<Determination of Target Shift Speed>

The integrated control section 46 determines a target shift speed for the transmission device TM based on the vehicle speed, required transmission input torque, and the shift position. The required transmission input torque is the required torque of the driving force source E that is transferred to the input member I of the transmission device TM. In the present embodiment, the required transmission input torque is the required internal combustion engine torque.

The integrated control section 46 references a shift map stored in the ROM or the like to determine the target shift speed based on the vehicle speed and the required internal combustion engine torque. The shift map includes a plurality of upshift lines and a plurality of downshift lines. When the vehicle speed and the required internal combustion engine torque are changed to cross over an upshift line or a downshift line on the shift map, the integrated control section 46 determines a new target shift speed for the transmission device TM.

When a shift speed limiting position such as the "2 position" and the "L position" is selected as the shift position, the integrated control section 46 determines a shift speed that is selectable in that position as the target shift speed based on the vehicle speed and the required internal combustion engine torque, using the shift map corresponding to that position. When the "R position" is selected, the integrated control section 46 determines the reverse speed Rev as the target shift speed. If the "P position" or the "N position" is selected, the integrated control section 46 determines a neutral state in which all the engagement devices C1, C2, . . . are disengaged as the target shift speed. This neutral state is referred to as a "neutral speed" for the sake of convenience.

The integrated control section 46 may change the target shift speed when receiving an upshift request or a downshift request in accordance with a change in the shift position of the shift lever by the driver. The term "downshift" means switching from a shift speed with a lower speed ratio to another shift speed with a higher speed ratio, and the term "upshift" means switching from a shift speed with a higher speed ratio to another shift speed with a lower speed ratio.

1-3-2. Internal Combustion Engine Control Device 31

The internal combustion engine control device 31 includes the internal combustion engine control section 41 that controls the operation of the internal combustion engine ENG. in the present embodiment, when the required internal combustion engine torque is specified by the integrated control section 46, the internal combustion engine control section 41 performs torque control to control the internal combustion engine ENG to output the required internal combustion engine torque.

When a command to stop the rotation of the internal combustion engine ENG is received from the integrated control section 46 or the like, the internal combustion engine control section 41 stops fuel supply and ignition to the internal combustion engine ENG to place the internal combustion engine ENG into the rotation stop state.

When a start command is received from the integrated control section 46 or the like, the internal combustion engine control section 41 turns on a relay circuit that supplies electricity to the starter 13 so as to supply electricity to the starter 13 and rotate the internal combustion engine ENG, and starts fuel supply and ignition to the internal combustion engine ENG so as to start combustion of the internal combustion engine ENG.

1-3-3. Rotary Electric Machine Control Unit 32

The rotary electric machine control unit 32 includes the rotary electric machine control section 42 that controls the operation of the rotary electric machine MG. In the present embodiment, in the case where the required rotary electric machine torque is specified by the integrated control section 46, the rotary electric machine control section 42 controls the rotary electric machine MG to output the required rotary electric machine torque. More specifically, the rotary electric machine control section 42 controls the output torque of the rotary electric machine MG by controlling on and off of a plurality of switching elements of the inverter.

1-3-4. Power Transmission Control Unit 33

The power transmission control unit 33 includes the shift control section 43 that controls the transmission device TM and the lock-up control section 45 that controls the lock-up clutch LC.

1-3-4-1. Lock-up Control Section 45

The lock-up control section 45 controls the state of engagement of the lock-up clutch LC, In the present embodiment, the lock-up control section 45 controls the signal value to be supplied to each liner solenoid valve of the hydraulic control device PC such that the hydraulic pressure to be supplied to the lock-up clutch LC matches a hydraulic pressure command for the lock-up clutch LC provided by the integrated control section 46.

1-3-4-2. Shift Control Section 43

The shift control section 43 controls engagement and disengagement of the plurality of engagement devices C1, B1, . . . included in the transmission device TM to control the state of the transmission device TM.

In the present embodiment, the shift control section 43 controls the hydraulic pressure to be supplied to the plurality of engagement devices C1, B1, . . . included in the transmission device TM via the hydraulic control device PC so as to engage or disengage the engagement devices C1, B1, . . . and establish the target shift speed specified by the integrated control section 46 in the transmission device TM. More specifically, the shift control section 43 specifies for the hydraulic control device PC the target hydraulic pressures (hydraulic pressure commands) of the respective engagement devices, and the hydraulic control device PC supplies the hydraulic pressures corresponding to the specified target hydraulic pressures (hydraulic pressure commands) to the respective engagement devices. In the present embodiment, the shift control section 43 is configured to control the signal values to be supplied to the respective hydraulic control valves of the hydraulic control device PC so as to control the hydraulic pressures to be supplied to the respective engagement devices.

When performing shift control to switch between shift speeds, the shift control section 43 controls the hydraulic pressure command for the engagement devices C1, B1, . . . to engage or disengage the engagement devices C1, B1, . . . , and thereby switches the shift speed to be established by the transmission device TM to the target shift speed, In this step, the shift control section 43 specifies a disengagement-side engagement device that is an engagement device to be disengaged so as to switch between shift speeds, and an engagement-side engagement device that is an engagement device to be engaged so as to switch between shift speeds. Then, the shift control section 43 performs so-called switching shift that disengages the disengagement-side engagement device and engages the engagement-side engagement device in accordance with a preprogrammed shift control sequence.

<Neutral Travel Control>

In the present embodiment, the shift control section 43 is configured to perform neutral travel control to disengage all the plurality of engagement devices C1, B1, . . . while the wheels W are rotating so as to place the transmission device TM into the neutral state in which the driving force is not transferred. When in the neutral state, no shift speed is established in the transmission device TM, and the driving force is not transferred between the input member I and the output member O of the transmission device TM.

The neutral travel control is executed when the operation is in a predetermined gradual deceleration operation state in which the required vehicle torque is very small with respect to the travel resistance of the vehicle corresponding to the vehicle speed and so on, or when the operation is in the electric mode in which the vehicle travels with the driving force of the rotational rotary electric machine MG without using the driving force of the internal combustion engine ENG, while the wheels W are rotating, for example. During neutral travel control, the internal combustion engine ENG and the wheels W are not drivingly coupled.

In the present embodiment, the shift control section 43 is configured to, during execution of the neutral travel control, stop rotation of the internal combustion engine ENG by transmitting a rotation stop command to the internal combustion engine control section 41. The shift control section 43 may be configured to, during execution of the neutral travel control, idle the internal combustion engine ENG, without placing the internal combustion engine ENG into the rotation stop state.

The shift control section 43 executes recovery control for recovery to the normal travel by establishing a shift speed in the transmission device TM, when a neutral travel control condition is not satisfied due to an increase in accelerator operation amount, a reduction in the charge amount of the battery, or the like, during neutral travel control. The shift control section 43 is configured to, when establishing a target shift speed in the transmission device TM by executing recovery control, sequentially engage a plurality of engagement devices that establish the target shift speed.

1-3-4-3. Engagement Failure Determination Section 44

When shifting the transmission device TM from a state in which an object shift speed, which is a shift speed established by engagement of an object engagement device that is one of the plurality of engagement devices C1, B1, . . . and a non-object engagement device that is another one or more of the plurality of engagement devices C1, B1, . . . , is established and the vehicle is traveling to the neutral state in which no shift speed is established in the transmission device TM, and making the rotational speed ωe of the internal combustion engine ENG reduced, the engagement failure determination section 44 issues a command to disengage the object engagement device and a command to maintain engagement of the non-object engagement device, and then determines an engagement failure in the object engagement device based on a change in the rotational speed ωi of the input member I. That is, in order to shift the transmission device TM from a state in which the object shift speed is established and the vehicle is traveling to the neutral state in which no shift speed is established in the transmission device TM, when the object engagement device is disengaged while maintaining engagement of the non-object engagement device and the rotational speed ωe of the internal combustion engine ENG is made to be reduced, the engagement failure determination section 44 determines an engagement failure in the object engagement device based on a change in the rotational speed ωi of the input member I.

According to this characteristic configuration, it is possible to determine an engagement failure in the object engagement device, using the opportunity of shifting the transmission device TM to the neutral state during travel of the vehicle. The object engagement device is disengaged while maintaining engagement of the non-object engagement device and the rotational speed ωe of the internal combustion engine ENG is made to be reduced. Therefore, if there is no engagement failure in the object engagement device, the object engagement device is disengaged; the transmission device TM is shifted from a state in which the object shift speed is established to the neutral state; and the rotational speed ωi of the input member I decreases as the rotational speed ωe of the internal combustion engine ENG decreases. On the other hand, if there is an engagement failure in the object engagement device, the object engagement device is not actually disengaged; the transmission device TM is maintained in the state in which the object shift speed is established, without being shifted to the neutral state; and a decrease in the rotational speed ωi of the input member I along with a decrease in the rotational speed ωe of the internal combustion engine ENG does not occur but the rotational speed ωi of the input member I is maintained. Accordingly, since the behavior of the rotational speed ωi of the input member I varies depending on whether there is an engagement failure in the object engagement device, it is possible to determine an engagement failure in the object engagement device based on a change in the rotational speed ωi of the input member I.

An engagement failure in the object engagement device occurs when the hydraulic pressure supplied to the object engagement device does not change even when the command from the control device 30 is changed, due to a failure in a linear solenoid valve of the hydraulic control device PC or the like, or when paired engagement members of the object engagement device are secured to each other.

In the present embodiment, in the determination of an engagement failure, after the issuance of the command to disengage the object engagement device and the command to maintain engagement of the non-object engagement device, the engagement failure determination section 44 determines that there is no engagement failure in the object engagement device if a state continues in which a rotational speed difference between the rotational speed ωi of the input member I and a synchronous rotational speed that is the rotational speed ωi of the input member I obtained upon establishment of the object shift speed is greater than or equal to a determination threshold ΔωJ, and determines that there is an engagement failure in the object engagement device if a state continues in which the rotational speed difference between the rotational speed ωi of the input member I and the synchronous rotational speed is less than the determination threshold ΔωJ.

The determination threshold ΔωJ may have a predetermined value, or may have a value calculated on a case-by-case basis.

If there is an engagement failure in the object engagement device, the rotational speed ωi of the input member I does not change from the synchronous rotational speed. On the other hand, if there is no engagement failure in the object engagement device, the rotational speed ωi of the input member I decreases from the synchronous rotational speed as the rotational speed ωe of the internal combustion engine ENG decreases. According to the above configuration, it is possible to perform failure determination by comparing the rotational speed ωi of the input member I with the synchronous rotational speed.

In the present embodiment, after the issuance of the command to disengage the object engagement device and the command to maintain engagement of the non-object engagement device, the engagement failure determination section 44 determines a state in which there is no engagement failure in the object engagement device (normal engagement state) if the state in which the rotational speed difference between the rotational speed ωi of the input member I and the synchronous rotational speed is greater than or equal to the determination threshold ΔωJ continues for a period greater than or equal to a normality determination period ΔTNJ in a determination period ΔTJ, and determines that there is an engagement failure in the object engagement device (failed engagement state) if the state in which the rotational speed difference between the rotational speed ωi of the input member I and the synchronous rotational speed is less than the determination threshold ΔωJ continues for a period greater than or equal to a failure determination period ΔTFJ. If neither the failed engagement state nor the normal engagement state is determined in the determination period ΔTJ, the engagement failure determination section 44 determines that engagement failure determination cannot be made (undetermined state). The determination period ΔTJ is greater than the normality determination period ΔTNJ and the failure determination period ΔTFJ. Each of the determination period ΔTJ, the normality determination period ΔTNJ, and the failure determination period ΔTFJ may be a predetermined period, or may be a period calculated on a case-by-case basis.

The engagement failure determination section 44 determines whether predetermined start conditions for engagement failure determination are satisfied. Then, the engagement failure determination section 44 executes engagement failure determination if the start conditions for engagement failure determination are satisfied, and does not execute engagement failure determination if the start conditions for engagement failure determination are not satisfied. The start conditions for engagement failure determination include the following three conditions: (1) the engagement pressure (hydraulic pressure command) for the object engagement device and the non-object engagement device is high; the object shift speed is established; and the shift speed is not being changed; (2) control for shifting to the neutral state and reducing the rotational speed we of the internal combustion engine ENG is started; and (3) the synchronous shift speed of the object shift speed and the rotational speed ωi of the input member I match. The engagement failure determination section 44 determines that a determination permission condition is satisfied if all the three conditions are satisfied. Otherwise, the engagement failure determination section 44 determines that the determination permission condition is not satisfied.

Figure 5:
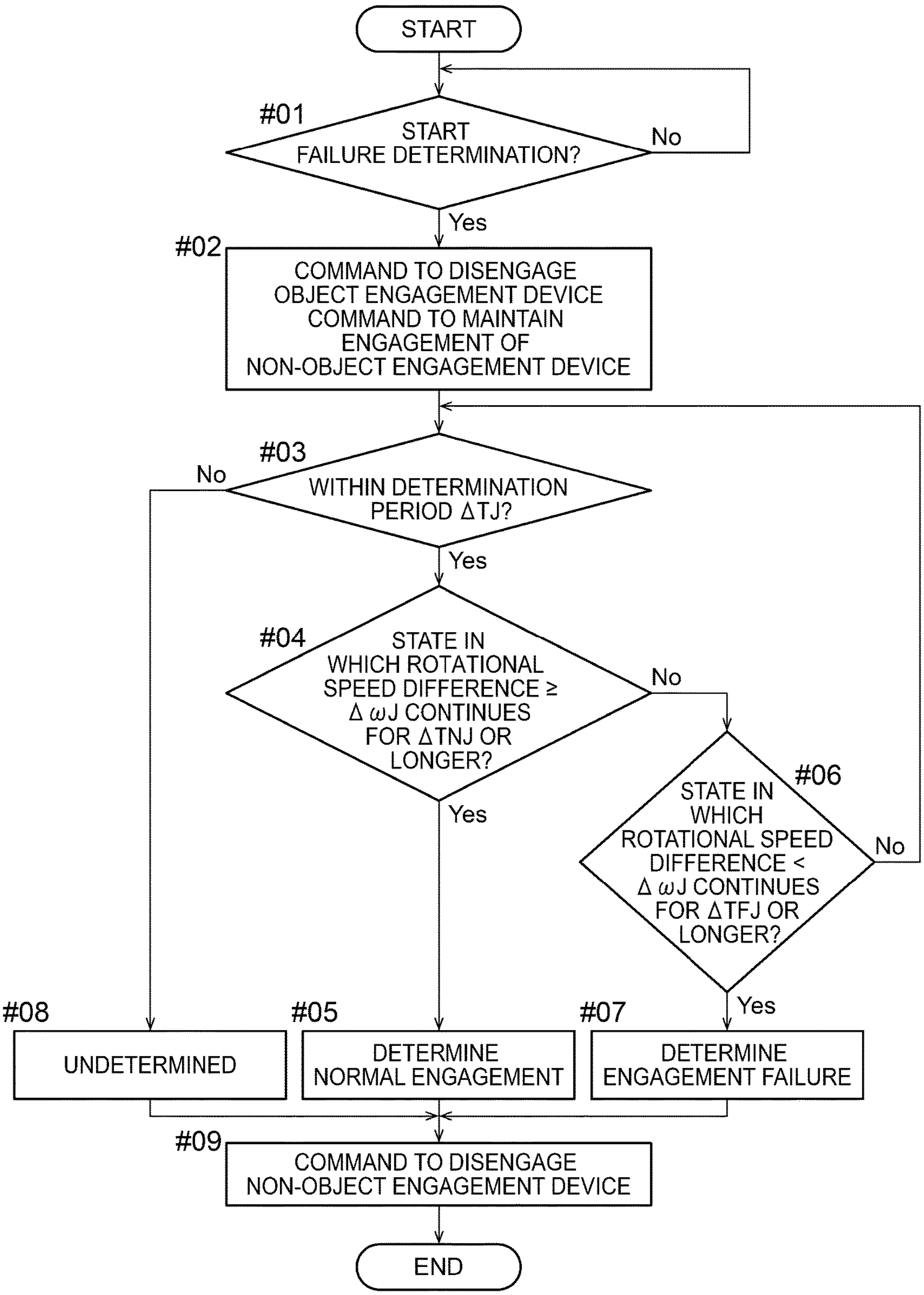
FIG. 5 is a flowchart according to a preferred embodiment.

The process described above can be configured as illustrated in the flowchart of FIG. 5. In step #01, the engagement failure determination section 44 determines whether the start conditions for engagement failure determination are satisfied as described above. If the start conditions for engagement failure determination are determined to be satisfied (step #01: Yes), the engagement failure determination section 44 issues a command to disengage the object engagement device and a command to maintain engagement of the non-object engagement device, and starts engagement failure determination (step #02).

Then, after the issuance of the command to disengage the object engagement device and the command to maintain engagement of the non-object engagement device, the engagement failure determination section 44 determines whether the determination period ΔTJ.has elapsed (step #03). If the determination period ΔTJ is determined not to have elapsed (step #03: Yes), the engagement failure determination. section 44 determines whether the state in which the rotational speed difference between the rotational speed ωi of the input member I and the synchronous rotational speed of the object shift speed is greater than or equal to the determination threshold ΔωJ continues for the normality determination period ΔTNJ or longer, after the start of the engagement failure determination (step #04). If the state is determined to continue for the normality determination period ΔTM or longer (step #04: Yes), the engagement failure determination section 44 determines that there is no engagement failure in the object engagement device (normal engagement state) (step #05). Then in step #09, the engagement failure determination section 44 issues a command to disengage the non-object engagement device, in addition to the object engagement device, and the engagement failure determination ends.

On the other hand, if the state is determined not to continue for the normality determination period ΔTNJ or longer (step #04: No), the engagement failure determination section 44 determines whether the state in which the rotational speed difference between the rotational speed ωi of the input member I and the synchronous rotational speed of the object shift speed is less than the determination threshold ΔωJ continues for a period greater than or equal to the failure determination period ΔTFJ, after the start of the engagement failure determination (step #06). If the state is determined to continue for the failure determination period ΔTFJ or longer (step #06: Yes), the engagement failure determination section 44 determines that there is engagement failure in the object engagement device (failed engagement state) (step #07). Then in step #09, the engagement failure determination section 44 issues a command to disengage the non-object engagement device, in addition to the object engagement device. Thus, the engagement failure determination ends.

If neither the normal engagement state nor the failed engagement state is determined (step #04: No, step #06: No), the process returns to step #03. Then, the engagement failure determination section 44 continues the engagement failure determination until the determination period ΔTJ elapses. If neither the normal engagement state nor the failed engagement state is determined and the determination period ΔTJ has elapsed, the engagement failure determination section 44 determines that engagement failure determination is undetermined (undetermined state) (step #08). Then in step #09, the engagement failure determination section 44 issues a command to disengage the non-object engagement device, in addition to the object engagement device. Thus, the engagement failure determination ends.

The engagement failure determination section 44 may be configured to determine an engagement failure in the object engagement device based on the rotational speed of the output member O, in addition to the change in the rotational speed ωi of the input member I. When the rotational speed of the output member O is low, the rotational speed ωi of the input member I before the start of engagement failure determination is low, which makes it difficult to perform engagement failure determination based on a change (in this example, a reduction) in the rotational speed ωi of the input member I. The engagement failure determination section 44 is configured not to perform engagement failure determination if the rotational speed of the output member O or the rotational speed ωi of the input member I that is determined based on the rotational speed of the output member O is less than or equal to a start threshold. That is, a condition based on the vehicle speed (the rotational speed ωi of the input member I) is added to the start conditions for engagement failure determination. The start threshold may have a predetermined value, or may have a value calculated on a case-by-case basis. The rotational speed of the output member O may be the rotational speed detected by a dedicated rotational speed sensor (in this example, the output rotational speed sensor Se2), or may be the rotational speed calculated from the vehicle speed.

When recovering from the neutral state, it is desired to prevent a situation in which, due to an engagement failure in the object engagement device, a shift speed lower than the originally desired shift speed is established, and the rotational speed of the internal combustion engine increases sharply, so that unintended deceleration torque is transferred to the wheels W, and the internal combustion engine rotates at a rotational speed higher than the intended rotational speed.

In view of the above, in the present embodiment, an engagement device that can be specified as an object engagement device is an engagement device of a plurality of engagement devices that establish the object shift speed, and non-object shift speeds (excluding the object shift speed) established by engagement of a non-object engagement device other than the object engagement device include a shift speed having a lower speed ratio than the object shift speed. The object engagement device and the object shift speed may be determined in advance, or may be specified on a case-by-case basis.

In the embodiment described below, the first brake B1 is specified as the object engagement device. As illustrated in FIG. 4, two shift speeds, the second shift speed "2nd" and the sixth shift speed "6th", are specified as the object shift speeds. If the second shift speed "2nd" is specified as the object shift speed, the first clutch C1 is specified as the non-object engagement device. If the sixth shift speed "6th" is specified as the object shift speed, the second clutch C2 is specified as the non-object engagement device.

In the present embodiment, when shifting from the normal travel state in which the vehicle is traveling with a shift speed established in the transmission device TM to the neutral travel state, engagement failure determination is performed. When in the neutral travel state, the internal combustion engine ENG is shifted to the rotation stop state, and therefore the rotational speed toe of the internal combustion engine ENG decreases.

Figure 6:
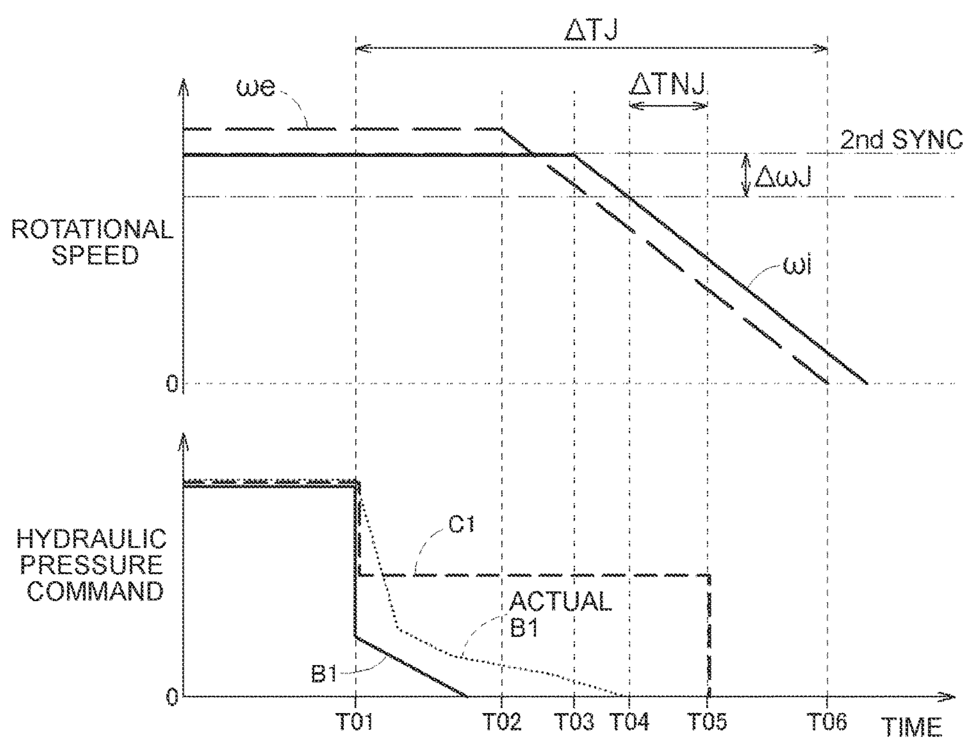
FIG. 6 is a time chart according to a preferred embodiment.

A description will be given with reference to an example of a time chart illustrated in FIG. 6, The example of FIG. 6 illustrates the case where there is no engagement failure in the object engagement device.

Until time T01, the parallel mode is set. In the normal travel state in which the second shift speed "2nd" is established by engagement of the first brake B1 and the first clutch C1, at least the driving force of the internal combustion engine ENG is transferred to the wheels W such that the vehicle travels, The lock-up clutch LC is placed in the disengaged state, and there is a rotational speed difference between the rotational speed ωe of the internal combustion engine ENG and the rotational speed ωi of the input member I. At time T01, the shift control section 43 determines to shift from the normal travel state to the neutral travel state in response to a reduction in the accelerator operation amount and an increase in the charge amount of the battery.

At time T01, the engagement failure determination section 44 starts disengagement of the first brake B1 specified as the object engagement device. The engagement failure determination section 44 lowers the hydraulic pressure command for the first brake B1 from the full engagement pressure in a stepwise manner, and then gradually lowers the hydraulic pressure command to a level lower than the torque transfer start pressure. On the other hand, in order to maintain the first clutch C1 specified as the non-object engagement device in the engaged state, the engagement failure determination section 44 lowers, in a stepwise manner, the hydraulic pressure command for the first clutch C1 from the full engagement pressure to an engagement maintaining pressure that is higher than the torque transfer start pressure and at which the engaged state can be maintained, arid then maintains the hydraulic pressure command at the engagement maintaining pressure (from time T01 to time T05). The term "full engagement pressure" as used herein refers to the maximum engagement pressure (supply hydraulic pressure, hydraulic pressure command) that is set to maintain the engaged state without any slip even if the torque transferred to each engagement device from the driving force source E varies.

At time T01, the shift control section 43 issues a rotation stop command to the internal combustion engine control section 41. The internal combustion engine control section 41 stops fuel supply to the internal combustion engine ENG so that combustion in the internal combustion engine ENG stops at time T02. The rotational speed we of the internal combustion engine ENG gradually decreases in accordance with the inertia moment of the internal combustion engine ENG (after time T02).

Since there is no engagement failure in the first brake B1, the actual hydraulic pressure of the first brake B1 decreases with a delay with respect to the decrease in the hydraulic pressure command (from time T01 to time T04). At time T03, the actual hydraulic pressure of the first brake B1 falls below the torque transfer start pressure, so that the first brake B1 is shifted to the disengaged state. After the shift to the disengaged state, the rotational speed ωi of the input member I gradually decreases from the synchronous rotational speed of the second shift speed "2nd" specified as the object shift speed, as the rotational speed ωe of the internal combustion engine ENG decreases, in accordance with the inertia moment of a member that rotates with the input member I (after time T03). The engagement failure determination section 44 multiplies the rotational speed of the output member O by the speed ratio of the second shift speed "2nd" to calculate the synchronous rotational speed.

At time T04, the rotational speed ωi of the input member I becomes lower than the synchronous rotational speed by the determination threshold ΔωJ or more. Then, at time T05, since the state in which the rotational speed difference between the rotational speed ωi of the input member I and the synchronous rotational speed is greater than or equal to the determination threshold ΔωJ continues for the normality determination period ΔTNJ or longer, the engagement failure determination section 44 determines that there is no engagement failure in the object engagement device (normal engagement state). Then, the engagement failure determination section 44 reduces the engagement pressure (hydraulic pressure command) of the first clutch C1 specified as the non-object engagement device to a level below the torque transfer start pressure so as to shift the first clutch C1 to the disengaged state, and the engagement failure determination ends (time T05).

<Establishment of Shift Speed in Case Where Failed Engagement State or Normal Engagement State is Determined>

The following describes establishment of a shift speed in the case where an engagement failure is determined when there are a plurality of object shift speeds, namely, the second shift speed "2nd" and the sixth shift speed "6th", as in the present embodiment.

If a determination is made that there are a plurality of object shift speeds and there is an engagement failure in the object engagement device, the engagement failure determination section 44 determines, among a plurality of object shift speeds, an exceeding object shift speed that is an object shift speed at which the rotational speed ωe of the internal combustion engine ENG exceeds an upper limit ωemx, and a non-exceeding object shift speed that is an object shift speed at which the rotational speed ωe of the internal combustion engine ENG does not exceed the upper limit ωemx, when establishing a shift speed in the transmission device TM from the neutral state. Then, the engagement failure determination section 44 permits establishment of a shift speed that is established by engagement of a non-object engagement device associated with the non-exceeding object shift speed, and prevents establishment of a shift speed that is established by engagement of a non-object engagement device associated with the exceeding object shift speed. On the other hand, if a determination is made that there is no engagement failure in the object engagement device, the engagement failure determination section 44 permits establishment of all the shift speeds, when establishing a shift speed in the transmission device TM from the neutral state.

If the object engagement device is in the failed engagement state, only one of the plurality of object shift speeds that are established by engagement of at least the object engagement device can be established in the transmission device TM. According to the above configuration, if a determination is made that there is an engagement failure in the object engagement device, establishment of an exceeding object shift speed that is an object shift speed at which the rotational speed ωe of the internal combustion engine ENG exceeds the upper limit ωemx is prevented, and establishment of a non-exceeding object shift speed that is an object shift speed at which the rotational speed ωe does not exceed the upper limit ωemx is permitted, among the plurality of object shift speeds. Accordingly, it is possible to prevent the rotational speed ωe of the internal combustion engine ENG from exceeding the upper limit ωemx in response to establishment of the object shift speed. That is, if a determination is made that there is an engagement failure in the object engagement device, a shift speed that is one of non-exceeding object shift speeds among the plurality of object shift speeds is established, when establishing a shift speed in the transmission device TM from the neutral state. The non-exceeding object shift speeds are the object shift speeds at which the rotational speed ωe of the internal combustion engine ENG does not exceed the upper limit ωemx. On the other hand, if a determination is made that there is no engagement failure in the object engagement device, establishment of all the shift speeds is permitted as in the usual case.

Further, even if a determination is made that there is an engagement failure in the object engagement device, if the rotational speed ωe of the internal combustion engine ENG does not exceed the upper limit ωemx even upon establishment of a shift speed with the highest speed ratio among the plurality of object shift speeds, establishment of all the shift speeds is permitted, when establishing a shift speed in the transmission device TM from the neutral state. Even if there is an engagement failure in the object engagement device, if the vehicle speed is low and therefore the rotational speed ωe of the internal combustion engine ENG does not exceed the upper limit ωemx even when the object shift speed is established, there is no problem in establishing the object shift speed. Accordingly, in this case, establishment of all the shift speeds is permitted.

The upper limit ωemx of the rotational speed ωe of the internal combustion engine ENG is a rotational speed that is a so-called rev limit. The upper limit ωemx is the maximum rotational speed that is set for preventing damage to the internal combustion engine ENG due to an excessive increase in the rotational speed ωe of the internal combustion engine ENG and for preventing an increase in the vibration and noise of the internal combustion engine ENG When the rotational speed toe of the internal combustion engine ENG exceeds the upper limit ωemx, the internal combustion engine control section 41 stops fuel supply, for example, to perform control such that the rotational speed ωe of the internal combustion engine ENG does not exceed the upper limit ωemx.

<Establishment of Shift Speed in Case Where Undetermined State is Determined>

Figure 7:
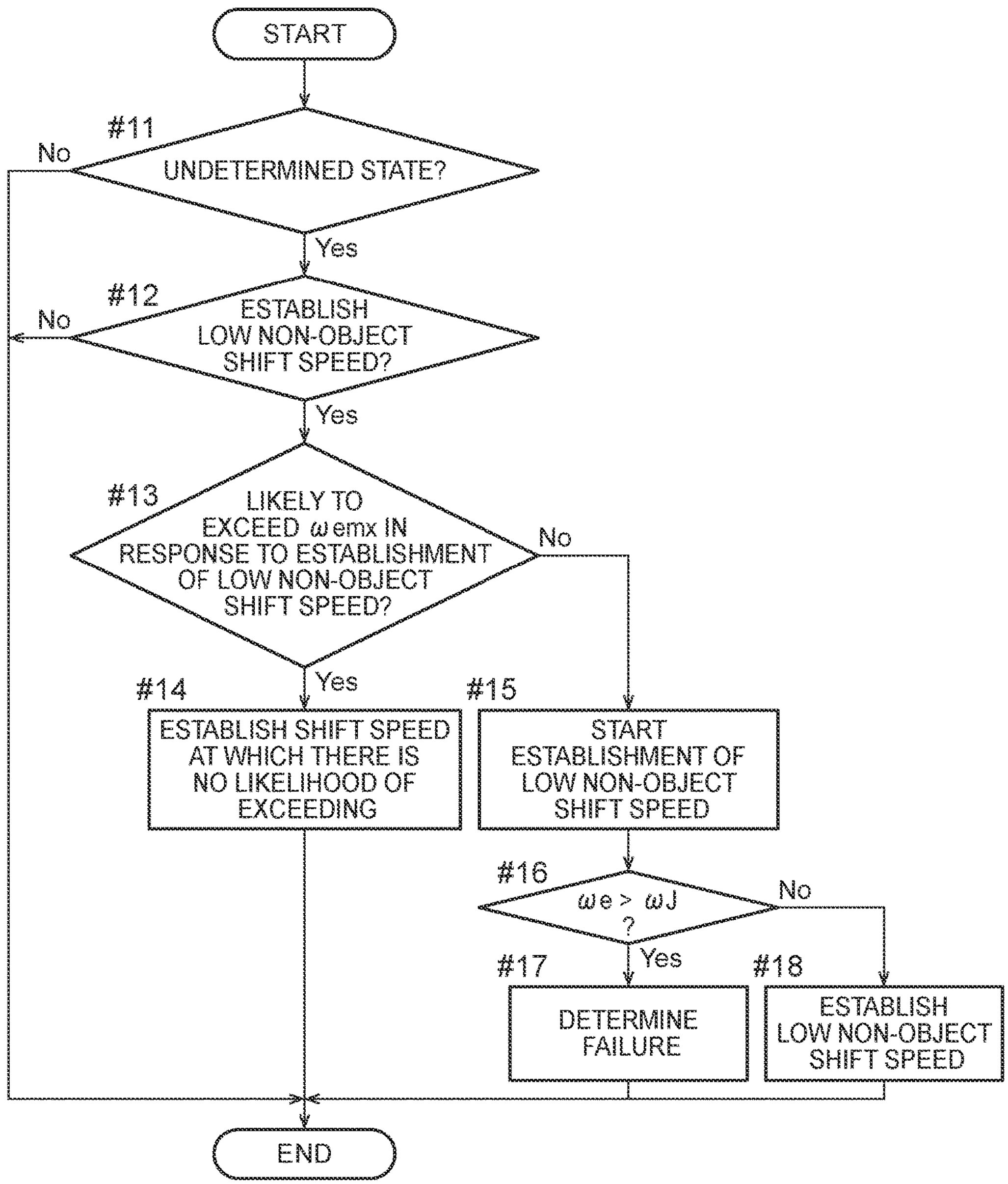
FIG. 7 is a flowchart according to a preferred embodiment.

As illustrated in a flowchart of FIG. 7, if a determination as to whether there is an engagement failure in the object engagement device cannot be made and an undetermined state is determined (step #11: Yes), before establishing in the transmission device TM a low non-object shift speed, which is a shift speed that has a lower speed ratio than the object shift speed and is established by engagement of at least the non-object engagement device (step #12: Yes), the engagement failure determination section 44 determines whether there is a likelihood that the rotational speed toe of the internal combustion engine ENG exceeds the upper limit ωemx in response to establishment of the low non-object shift speed (step #13).

Then, if a determination is made that there is a likelihood of exceeding the upper limit ωemx (step #13: Yes), the engagement failure determination section 44 establishes a shift speed at Which there is no likelihood of exceeding the upper limit ωemx (step #14). For example, when the low non-object shift speed is the third shift speed "3rd", the fourth shift speed "4th" is established.

On the other hand, if a determination is made that there is no likelihood of exceeding the upper limit ωemx (step #13: No), the engagement failure determination section 44 starts establishment of the low non-object shift speed (step #15). After engagement of the non-object engagement device, if the rotational speed ωe of the internal combustion engine ENG exceeds the determination threshold ωJ that is lower than the upper limit ωemx (step #16: Yes), the engagement failure determination section 44 determines that there is an engagement failure in the object engagement device, and terminates establishment of the low non-object shift speed (step #17). On the other hand, after engagement of the non-object engagement device, if the rotational speed ωe of the internal combustion engine ENG does not exceed the determination threshold ωJ (step #16: No), the engagement failure determination section 44 maintains establishment of the low non-object shift speed (step #18)

If an undetermined state is determined in which a determination cannot be made as to whether there is an engagement failure in the object engagement device, it is highly likely that there is actually an engagement failure. In the case where the object engagement device is in the failed engagement state, if the non-object engagement device is engaged so as to establish a shift speed that is engaged by engagement of the non-object engagement device, the object shift speed is established unintentionally. If the speed ratio of the object shift speed is lower than the shift speed intended to be established by engagement of the non-object engagement device, the rotational speed ωi of the input member I might increase more sharply than expected and exceed the upper limit ωemx in response to establishment of the object shift speed. In view of a sharp increase in the rotational speed ωe of the internal combustion engine ENG, in order to perform engagement failure determination of the object engagement device, it is necessary to at least prevent the rotational speed ωe of the internal combustion engine ENG from exceeding the upper limit ωemx in response to establishment of the low non-object shift speed that has a lower speed ratio than the object shift speed and is established by engagement of at least the non-object engagement device.

According to the above configuration, if a determination is made that there is a likelihood that the rotational speed ωe of the internal combustion engine ENG exceeds the upper limit ωemx in response to establishment of the low non-object shift speed, a shift speed at which there is no likelihood of exceeding the upper limit ωemx is established. Therefore, even if the object engagement device is actually in the failed engagement state, it is possible to prevent the internal combustion engine ENG from exceeding the upper limit ωemx.

On the other hand, if a determination is made that there is no likelihood of exceeding the upper limit ωemx in response to establishment of the low non-object shift speed, establishment of the low non-object shift speed is started. After engagement of the non-object engagement device, if the rotational speed ωe of the internal combustion engine ENG exceeds the determination threshold ωJ that is lower than the upper limit ωemx, a determination can be made that the object shift speed is established due to an engagement failure in the object engagement device. On the other hand, after engagement of the non-object engagement device, if the rotational speed ωe of the internal combustion engine ENG does not exceed the determination threshold ωJ, it is possible to maintain establishment of the low non-object shift speed.

In the present embodiment, as illustrated in FIG. 4, although the third shift speed "3rd" and the fourth shift speed "4th" may be specified as the low non-object shift speed that has a lower speed ratio than the second shift speed "2nd" specified as the object shift speed and is established by engagement of the first clutch Cl specified as the non-object engagement device, the third shift speed "3rd" is specified as the low non-object shift speed.

In the present embodiment, when establishing the first shift speed "1st", the second shift speed "2nd", and the third shift speed "3rd", the first clutch C1 is engaged, and thereafter another engagement device such as the first brake B1, the third clutch C3 is engaged. Further, when establishing the fourth shift speed "4th", the fifth shift speed "5th", and the sixth shift speed "6th", the second clutch C2 is engaged, and thereafter another engagement device such as the first clutch C1 and the third clutch C3 is engaged. Therefore, when establishing the third shift speed "3rd", the first clutch C1 specified as the non.-object engagement device is engaged first. When establishing the fourth shift speed "4th", the first clutch C1 is engaged later. Accordingly, in the present embodiment, after engagement of the first clutch C1 specified as the non-object engagement device, the third shift speed "3rd" is specified as the low non-object shift speed as described above, in order to perform engagement failure determination.

A description will be given with reference to an example of a time chart illustrated in FIG. 8. The example of FIG. 8 illustrates the ease where although the object engagement device is in the undetermined state, there is actually an engagement failure.

Until time T11, the neutral travel state is set, and the internal combustion engine ENG is placed in the rotation stop state. The hydraulic pressure for the first brake B1 specified as the object engagement device is set to zero. However, there is an engagement failure, so the actual hydraulic pressure for the first brake B1 is maintained near the full engagement pressure. Such an engagement failure occurs due to a failure in a linear solenoid valve of the hydraulic control device PC or the like.

At time T11, a neutral travel control condition is not satisfied due to an increase in accelerator operation amount, a reduction in the charge amount of the battery, or the like, so that the shift control section 43 determines to execute recovery control for recovery to the normal travel by establishing a shift speed in the transmission device TM. In response to starting of the recovery control, starting of the internal combustion engine ENG is initiated. After the starting of the internal combustion engine ENG is initiated, the rotational speed ωe of the internal combustion engine ENG increases, The lock-up clutch LC of the torque converter TC is controlled to be in the disengaged state, and the rotational speed ωi of the input member I falls below the rotational speed ωe of the internal combustion engine ENG, and follows the rotational speed ωe of the internal combustion engine ENG with a rotational speed difference.

Figure 8:
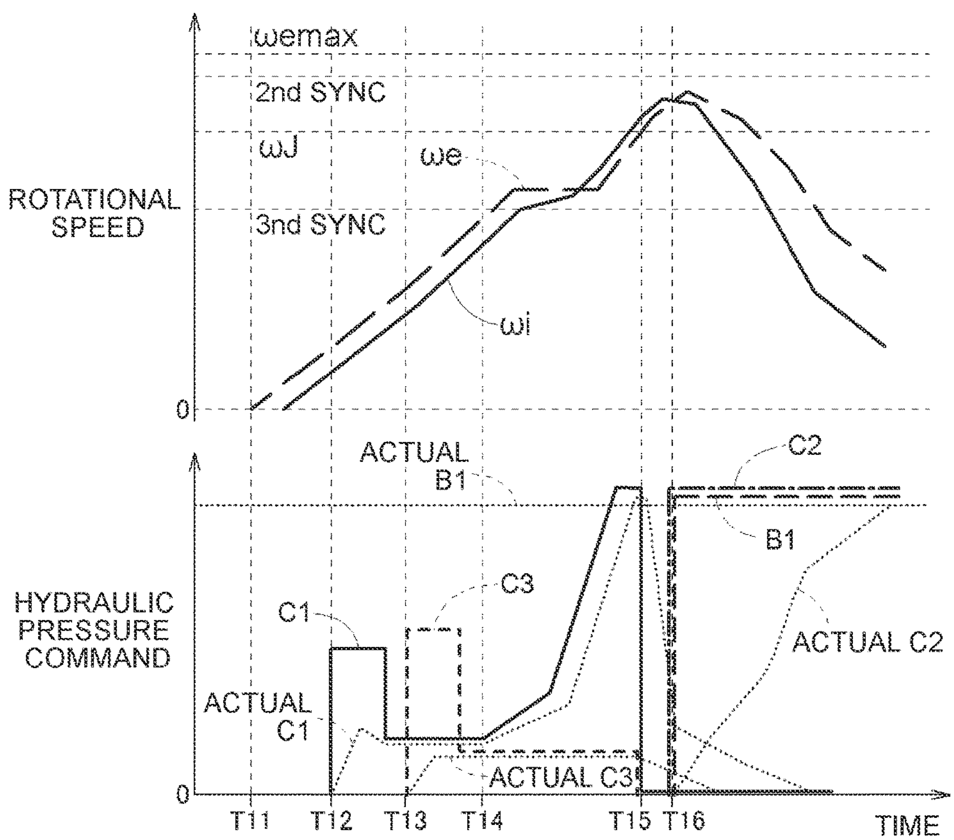
FIG. 8 is a time chart according to a preferred embodiment.

In the example illustrated in FIG. 8, the third shift speed "3rd" specified as the low non-object shift speed is specified as the target shift speed. The synchronous rotational speed of the third shift speed "3rd" is sufficiently lower than the upper limit ωemx, and therefore the engagement failure determination section 44 determines that there is no likelihood that the rotational speed ωe of the internal combustion engine ENG exceeds the upper limit ωemx in response to establishment of the low non-object shift speed (time T11). Accordingly, the engagement failure determination section 44 starts establishment of the third shift speed "3rd".

When the rotational speed ωe of the internal combustion engine ENG starts to increase, engagement of the first clutch C1 is started (time T12) so as to establish the third shift speed "3rd". The engagement failure determination section 44 performs preliminary charge that increases the hydraulic pressure command for the first clutch C1 to a standby pressure that is set to a pressure lower than the torque transfer start pressure (from time T12 to time T14). The engagement failure determination section 44 temporarily increases the hydraulic pressure command for the former engagement device to a level higher than the standby pressure, and accelerates the rise in the actual pressure. After the start of the preliminary charge of the first clutch C1, the engagement failure determination section 44 starts preliminary charge that increases the hydraulic pressure command for the third clutch C3 to a standby pressure that is set to a pressure lower than the torque transfer start pressure (time T13). In the present embodiment, the preliminary charge of the third clutch C3 is started after completion of the preliminary charge of the first clutch C1 (after completion of increase control that temporarily increases the hydraulic pressure from the standby pressure, in this example). The engagement failure determination section 44 temporarily increases the hydraulic pressure command for the third clutch C3 to a level higher than the standby pressure, and accelerates the rise in the actual pressure.

After completion of the preliminary charge, the engagement failure determination section 44 gradually increases the hydraulic pressure command for the first clutch C1 from the standby pressure (after time T14), When the engagement pressure of the first clutch C1 increases, the second shift speed "2nd" starts to be established because there is an engagement failure in the first brake B1, and the rotational speed ωi of the input member I increases to the synchronous rotational speed of the second shift speed "2nd" (from time T14 to time T15).

At time T15, the rotational speed ωe of the internal combustion engine ENG exceeds the determination threshold ωJ of that is lower than the upper limit ωemx, Therefore, the engagement failure determination section 44 determines that there is an engagement failure in the first brake B1 specified as the object engagement device, and terminates establishment of the third shift speed "3rd". More specifically, the engagement failure determination section 44 terminates engagement of the first clutch C1 and the third clutch C3, and reduces their hydraulic pressure commands to zero (time T15).

In the present embodiment, as described above, there are two object shift speeds, namely, the second shift speed "2nd" and the sixth shift speed "6th", that are established by engagement of the first brake B1 specified as the object engagement device, and the engagement failure determination section 44 determines the sixth shift speed "6th" as the non-exceeding object shift speed that does not exceed the upper limit ωemx, and determines the second shift speed "2nd" as the exceeding object shift speed that exceeds the upper limit ωemx. Accordingly, the engagement failure determination section 44 permits establishment of the sixth shift speed "6th" that is the non-exceeding object shift speed. In order to establish the sixth shift speed "6th", the engagement failure determination section 44 starts engagement of the second clutch C2 specified as the non-object engagement device of the sixth shift speed "6th", and increases the hydraulic pressure command for the second clutch C2 (time T16). Further, in order to prevent a situation in which the first brake B1 recovers to the normal state due to some factors and the sixth seed "6th" is not established, the engagement failure determination section 44 also increases the hydraulic pressure command for the first brake B1 (time T16). When the second shift speed "2nd" starts to be established, the rotational speed ωi of the input member I drops to the synchronous rotational speed of the sixth shift speed. "6th" (after time T16).

<Other Embodiments>

Hereinafter, other embodiments will be described. The configuration disclosed in each of the following embodiments may be applied alone, or may be applied in combination with the configuration disclosed in. any other embodiments as long as no inconsistency arises.

(1) in the above embodiment, the rotary electric machine MG is drivingly coupled to the wheels W different from the wheels W to which the output member O is drivingly coupled. However, embodiments of the present invention are not limited thereto. That is, the rotary electric machine MG may be drivingly coupled to the wheels W to which the output member O is drivingly coupled. In this case, for example, the rotary electric machine MG may be drivingly coupled to the power transmission path between the transmission device TM and the wheel W, and more specifically to the output member O on the wheels W side with respect to the transmission device TM, for example. Alternatively, the vehicle 5 may not include the rotary electric machine MG.

(2) In the above embodiment, the internal combustion engine ENG as the driving force source E is drivingly coupled to the input member I. However, embodiments of the present invention are not limited thereto. That is, the internal combustion engine ENG and the rotary electric machine MG may be drivingly coupled as the driving force source E to the input member I of the transmission device TM. Alternatively, the rotary electric machine MG may be drivingly coupled in place of the internal combustion engine ENG.

(3) In the above embodiment, the lockup clutch LC is controlled to be in the disengaged state during engagement control. However, embodiments of the present invention are not limited thereto. During engagement control, the lock-up clutch LC may be control led to be in the engagement state.

(4) In the above embodiment, the engagement failure determination section 44 is configured to execute engagement failure determination when the internal. combustion engine ENG is placed in the engine stop state and the rotational speed ωe of the internal combustion engine ENG is made to be reduced. However, embodiments of the present invention are not limited thereto. That is, the engagement failure determination section 44 may be configured to execute engagement failure determination when the internal combustion engine ENG is in the operating state and the rotational speed ωe of the internal combustion engine ENG decreases.

(5) In the above embodiment, the engagement failure determination section 44 is configured to perform engagement failure determination when shifting from the normal travel state to the neutral travel state. However, embodiments of the present invention are not limited thereto. That is, the engagement failure determination section 44 may be configured to perform engagement failure determination when performing any control as long as the engagement failure determination is performed when shifting from a state in which the object shift speed is established to the neutral state and making the rotational speed ωe of the internal combustion engine ENG reduced.

(6) In the above embodiment, in the example of FIG. 6, the engagement failure determination section 44 is configured to perform engagement failure determination When the first brake B1 is specified as the object engagement device; the first clutch C1 is specified as the non-object engagement device; and the second shift speed "2nd" is specified as the object shift speed. However, embodiments of the present invention are not limited thereto. That is, the engagement failure determination section 44 may be configured to perform engagement failure determination when the first brake 131 is specified as the object engagement device; the second clutch C2 is specified as the non-object engagement device; and the sixth shift speed "6th" is specified as the object shift speed.

Further, when performing engagement failure determination, any engagement device other than the first brake 131 may be specified as the object engagement device; any engagement device other than the first clutch Cl may be specified as the non-object engagement device; and any shift speed other than the second shift speed "2nd" may be specified as the object shift speed.

For example, the third clutch C3 may be specified as the object engagement device, and the two shift speeds, the third shift speed "3rd" and the fifth shift speed "5th" may be specified as the object shift speeds. If the third shift speed "3rd" is specified as the object shift speed, the first clutch Cl may be specified as the non-object engagement device. If the fifth shift speed "5th" is specified as the object shift speed, the second clutch C2 may be specified as the non-object engagement device.

(7) In the above embodiment, the torque converter TC is provided between the internal combustion engine ENG and the transmission device TM. However, embodiments of the present invention are not limited thereto. That is, the torque converter TC may not be provided, or a clutch may be provided in place of the torque converter TC, between the internal combustion engine ENG and the transmission device TM.

(8) In the above embodiment, the control device 30 includes the plurality of control units 32 to 34, and the plurality of control units 32 to 34 are assigned the plurality of functional sections 41 to 46, However, embodiments of the present invention are not limited thereto. That is, the control device 30 may be provided as a control device in which the plurality of control units 32 to 34 described above are combined in desired combinations or separated, Further, the plurality of functional sections 41 to 46 may be assigned as desired.

(9) In the above embodiment, the transmission device TM includes two planetary gear mechanisms, six engagement devices, and six forward shift speeds, and each of the shift speeds is established by engaging two engagement devices. However, embodiments of the present invention are not limited thereto. That is, the transmission device TM may have any configuration as long as the transmission device TM provides one or more shift speeds each established by engagement of at least two engagement devices. In other words, the transmission device TM may include two or more, or one planetary gear mechanism, may include two or more engagement devices, and may provide one or more forward shift speeds. Each shift speed may be established by engaging three or more engagement devices.

2. Summary of Embodiments

The embodiments of the present invention described above include at least the following configuration.

A control device (30) for a vehicle drive apparatus (1), the vehicle drive apparatus (1) including, on a power transmission path connecting an input member (I) drivingly coupled to a driving force source (E) and an output member (O) drivingly coupled to wheels (W), a transmission device (TM) that includes a plurality of engagement devices (C1, B1, . . . ) and establishes a plurality of shift speeds with different speed ratios in accordance with a state of engagement of the plurality of engagement devices (C1, B1, . . . ), wherein in order to shift the transmission device (TM) from a state in which an object shift speed is established and a vehicle is traveling to a neutral state in which no shift speed is established in the transmission device (TM), the object shift speed being a shift speed established by engagement of an object engagement device that is one of the plurality of engagement devices (C1, B1, . . . ) and a non-object engagement device that is another one or more of the plurality of engagement devices (C1, B1, . . . ), when the object engagement device is disengaged while maintaining engagement of the non-object engagement device and a rotational speed (ωe) of the driving force source (E) is made to be reduced, an engagement failure in the object engagement device is determined based on a change in a rotational speed (ωi) of the input member (I).

According to this characteristic configuration, it is possible to determine an engagement failure in the object engagement device, using the opportunity of shifting the transmission device to the neutral state during travel of the vehicle. Therefore, it is possible to determine an engagement failure without increasing the time needed for the next establishment of a shift speed. More specifically, the object engagement device is disengaged while maintaining engagement of the non-object engagement device, and the rotational speed (ωe) of the driving force source (E) is made to be reduced. Therefore, if there is no engagement failure in the object engagement device, the object engagement device is disengaged; the transmission device (TM) is shifted from a state in which the object shift speed is established to the neutral state; and the rotational speed (ωi) of the input member (1) decreases as the rotational speed (ωe) of the driving force source (E) decreases. On the other hand, if there is an engagement failure in the object engagement device, the object engagement device is not actually disengaged; the transmission device (TM) is not shifted to the neutral state; and the rotational speed (ωe) of the input member (I) is maintained without decreasing. Accordingly, since the behavior of the rotational speed (ωi) of the input member (I) varies depending on whether there is an engagement failure in the object engagement device, it is possible to determine an engagement failure in the object engagement device based on a change in the rotational speed (ωi) of the input member (I). Further, according to this characteristic configuration, since it is possible to perform failure determination when shifting from the state in which a shift speed is established to the neutral state, it is easy to prevent an unintended shift speed from being established in the next establishment of a shift speed.

Further, in the embodiment, it is preferable that an engagement failure in the object engagement device be determined based on a rotational speed of the output member (O), in addition to the change in the rotational speed (ωi) of the input member (I).

When the rotational speed of the output member (O) is low, the rotational speed (ωi) of the input member (I) before the start of engagement failure determination is low, which makes it difficult to perform engagement failure determination based on a change in the rotational speed (ωi) of the input member (I). According to the above configuration, since an engagement failure is determined based also on the vehicle speed, the determination accuracy is improved.

Further, in the embodiment, it is preferable that in the determination of an engagement failure, after the object engagement device is disengaged while maintaining engagement of the non-object engagement device, a determination be made that there is no engagement failure in the object engagement device if a state continues in which a rotational speed difference between the rotational speed (ωi) of the input member (I) and a synchronous rotational speed that is the rotational speed (ωi) of the input member (I) obtained upon establishment of the object shift speed is greater than or equal to a determination threshold (ΔωJ), and a determination be made that there is an engagement failure in the object engagement device if a state continues in which the rotational speed difference between the rotational speed (ωi) of the input member (I) and the synchronous rotational speed is less than the determination threshold (ΔωJ).

if there is an engagement failure in the object engagement device, the rotational speed (ωi) of the input member (I) does not change from the synchronous rotational speed. On the other hand, if there is no engagement failure in the object engagement device, the rotational speed (ωi) of the input member (I) decreases from the synchronous rotational speed as the rotational speed (ωe) of the driving force source (E) decreases. According to the above configuration, it is possible to perform appropriate failure determination by comparing the rotational speed (ωi) of the input member (I) with the synchronous rotational speed.

Further, in the embodiment, it is preferable that: the object shift speed be provided in plurality; and if a determination is made that there is an engagement failure in the object engagement device, a shift speed that is one of non-exceeding object shift speeds among the plurality of object shift speeds is established, when establishing a shift speed in the transmission device (TM) from the neutral state, the non-exceeding object shift speeds being the object shift speeds at which the rotational speed (ωe) of the driving force source (E) does not exceed an upper limit (ωemx).

According to this configuration, if the object engagement device is in the failed engagement state, only one of the plurality of shift speeds that are established by engagement of at least the object engagement device can be established in the transmission device (TM). According to the above configuration, if a determination is made that there is an engagement failure in the object engagement device, a shift speed that is one of non-exceeding object shift speeds among the plurality of object shift speeds is established. The non-exceeding object shift speeds are the object shift speeds at which the rotational speed (ωe) of the driving force source (E) does not exceed the upper limit (ωemx). Accordingly, it is possible to prevent the rotational speed (ωe) of the driving force source (E) from exceeding the upper limit (ωemx) in response to establishment of the object shift speed. On the other hand, if a determination is made that there is no engagement failure in the object engagement device, all the shift speeds can be established as in the usual case.

Further, in the embodiment, it is preferable that if a determination is made that there is an engagement failure in the object engagement device, and if the rotational speed (ωe) of the driving force source (E) does not exceed the upper limit (ωemx) even. upon establishment of a shift speed with a highest speed ratio among the plurality of object shift speeds, establishment of all the shift speeds be permitted, when establishing a shift speed in the transmission device (TM) from the neutral state.

According to this configuration, even if a determination is made that there is an engagement failure in the object engagement device, it is possible to establish many shift speeds while preventing the rotational speed (ωe) of the driving force source (E) from exceeding the upper limit (ωemx).

Further, in the embodiment, it is preferable that: if a determination is not made as to whether there is an engagement failure in the object engagement device, before establishing a low non-object shift speed in the transmission device (TM), the low non-object shift speed being a shift speed that has a lower speed ratio than the object shift speed and is established by engagement of at least the non-object engagement device, a determination be made as to whether there is a likelihood that the rotational speed (ωe) of the driving force source (E) exceeds the upper limit (ωemx) in response to establishment of the low non-object shift speed; and if a determination is made that there is a likelihood of exceeding the upper limit (ωemx), a shift speed at which there is no likelihood of exceeding the upper limit (ωemx) be established, and if a determination is made that there is no likelihood of exceeding the upper limit (ωemx), establishment of the low non-object shift speed be started, and after engagement of the non-object engagement device, if the rotational speed (ωe) of the driving force source (E) exceeds a determination threshold (ωJ) that is lower than the upper limit (ωemx), a determination be made that there is an engagement failure in the object engagement device.

If a determination cannot be made as to whether there is an engagement failure in the object engagement device, it is highly likely that there is actually an engagement failure. In the case where the object engagement device is in the failed engagement state, if the non-object engagement device is engaged so as to establish a shift speed that is engaged by engagement of the non-object engagement device, the object shift speed is established unintentionally. If the speed ratio of the object shift speed is lower than the shift speed intended to be established by engagement of the non-object engagement device, the rotational speed (ωi) of the input shaft (I) might increase more sharply than expected and exceeds the upper limit (ωemx). In view of a sharp increase in the rotational speed (ωe) of the driving force source (E), in order to perform engagement failure determination of the object engagement device, it is necessary to at least prevent the rotational speed (ωe) of the driving force source (E) from exceeding the upper limit (ωemx) in response to establishment of the low non-object shift speed that has a lower speed ratio than the object shift speed and is established by engagement of at least the non-object engagement device.

According to the above configuration, if a determination is made that there is a likelihood that the rotational speed (ωe) of the driving force source (E) exceeds the upper limit (ωemx) in response to establishment of the low non-object shift speed, a shift speed at which there is no likelihood of exceeding the upper limit (ωemx) is established. Therefore, even if the object engagement device is actually in the flailed engagement state, it is possible to prevent the driving force source (E) from exceeding the upper limit (ωemx).

On the other hand, if a determination is made that there is no likelihood of exceeding the upper limit (ωemx) in response to establishment of the low non-object shift speed, establishment of the low non-object shift speed is started. After engagement of the non-object engagement device, if the rotational speed (ωe) of the driving force source (E) exceeds the determination threshold (ωJ) that is lower than the upper limit (ωemx), a determination can be made that the object shift speed is established due to an engagement failure in the object engagement device. On the other hand, after engagement of the non-object engagement device, if the rotational speed (ωe) of the driving force source (E) does not exceed the determination threshold (ωJ), it is possible to maintain establishment of the low non-object shift speed.

INDUSTRIAL APPLICABILITY

The present invention is suitably applicable to a control device or a vehicle drive apparatus including, on a power transmission path connecting an input member drivingly coupled to a driving force source and an output member drivingly coupled to wheels, a transmission device that includes a plurality of engagement devices and establishes a plurality of shift speeds with different speed ratios in accordance with the state of engagement of the plurality of engagement devices.

DESCRIPTION OF THE REFERENCE NUMERALS

1 vehicle drive apparatus
30 control device for vehicle drive apparatus
44 engagement failure determination section
B1 first brake (object engagement device)
C1 first clutch (non-object engagement device)
C2 second clutch (non-object engagement device)
ENG internal combustion engine
I input member
MG rotary electric machine
O output member
TM transmission device W wheel
ωe rotational speed of internal combustion engine
ωemx upper limit of internal combustion engine
ωi rotational speed of input member

The invention claimed is:

1. A control device for a vehicle drive apparatus, the vehicle drive apparatus including, on a power transmission path connecting an input member drivingly coupled to a driving force source and an output member drivingly coupled to wheels, a transmission device that includes a plurality of engagement devices and establishes a plurality of shift speeds with different speed ratios in accordance with a state of engagement of the plurality of engagement devices, wherein in order to shift the transmission device from a state in which an object shift speed is established and a vehicle is traveling to a neutral state in which no shift speed is established in the transmission device, the object shift speed being a shift speed established by engagement of an object engagement device that is one of the plurality of engagement devices and a non-object engagement device that is another one or more of the plurality of engagement devices, when the object engagement device is disengaged while maintaining engagement of the non-object engagement device and a rotational speed of the driving force source is made to be reduced, an engagement failure in the object engagement device is determined based on a change in a rotational speed of the input member.

2. The control device for a vehicle drive apparatus according to claim 1, wherein an engagement failure in the object engagement device is determined based on a rotational speed of the output member, in addition to the change in the rotational speed of the input member.

3. The control device for a vehicle drive apparatus according to claim 2, wherein in the determination of an engagement failure, after the object engagement device is disengaged while maintaining engagement of the non-object engagement device, a determination is made that there is no engagement failure in the object engagement device if a state continues in which a rotational speed difference between the rotational speed of the input member and a synchronous rotational speed that is the rotational speed of the input member obtained upon establishment of the object shift speed is greater than or equal to a determination threshold, and a determination is made that there is an engagement failure in the object engagement device if a state continues in which the rotational speed difference between the rotational speed of the input member and the synchronous rotational speed is less than the determination threshold.

4. The control device for a vehicle drive apparatus according to claim 2, wherein the object shift speed is provided in plurality; and if a determination is made that there is an engagement failure in the object engagement device, a shift speed that is one of non-exceeding object shift speeds among the plurality of object shift speeds is established, when establishing a shift speed in the transmission device from the neutral state, the non-exceeding object shift speeds being the object shift speeds at which the rotational speed of the driving force source does not exceed an upper limit.

5. The vehicle drive apparatus according to claim 4, wherein if a determination is made that there is an engagement failure in the object engagement device, and if the rotational speed of the driving force source does not exceed the upper limit even upon establishment of a shift speed with a highest speed ratio among the plurality of object shift speeds, establishment of all the shift speeds is permitted, when establishing a shift speed in the transmission device from the neutral state.

6. The control device for a vehicle drive apparatus according to claim 2, wherein if a determination is not made as to whether there is an engagement failure in the object engagement device, before establishing a low non-object shift speed in the transmission device, the low non-object shift speed being a shift speed that has a lower speed ratio than the object shift speed and is established by engagement of at least the non-object engagement device, a determination is made as to whether there is a likelihood that the rotational speed of the driving force source exceeds the upper limit in response to establishment of the low non-object shift speed; and if a determination is made that there is a likelihood of exceeding the upper limit, a shift speed at which there is no likelihood of exceeding the upper limit is established, and if a determination is made that there is no likelihood of exceeding the upper limit, establishment of the low non-object shift speed is started, and after engagement of the non-object engagement device, if the rotational speed of the driving force source exceeds a determination threshold that is lower than the upper limit, a determination is made that there is an engagement failure in the object engagement device.

7. The control device for a vehicle drive apparatus according to claim 1, wherein in the determination of an engagement failure, after the object engagement device is disengaged while maintaining engagement of the non-object engagement device, a determination is made that there is no engagement failure in the object engagement device if a state continues in which a rotational speed difference between the rotational speed of the input member and a synchronous rotational speed that is the rotational speed of the input member obtained upon establishment of the object shift speed is greater than or equal to a determination threshold, and a determination is made that there is an engagement failure in the object engagement device if a state continues in which the rotational speed difference between the rotational speed of the input member and the synchronous rotational speed is less than the determination threshold.

8. The control device for a vehicle drive apparatus according to claim 7, wherein the object shift speed is provided in plurality; and if a determination is made that there is an engagement failure in the object engagement device, a shift speed that is one of non-exceeding object shift speeds among the plurality of object shift speeds is established, when establishing a shift speed in the transmission device from the neutral state, the non-exceeding object shift speeds being the object shift speeds at which the rotational speed of the driving force source does not exceed an upper limit.

9. The vehicle drive apparatus according to claim 8, wherein if a determination is made that there is an engagement failure in the object engagement device, and if the rotational speed of the driving force source does not exceed the upper limit even upon establishment of a shift speed with a highest speed ratio among the plurality of object shift speeds, establishment of all the shift speeds is permitted, when establishing a shift speed in the transmission device from the neutral state.

10. The control device for a vehicle drive apparatus according to claim 7, wherein if a determination is not made as to whether there is an engagement failure in the object engagement device, before establishing a low non-object shift speed in the transmission device, the low non-object shift speed being a shift speed that has a lower speed ratio than the object shift speed and is established by engagement of at least the non-object engagement device, a determination is made as to whether there is a likelihood that the rotational speed of the driving force source exceeds the upper limit in response to establishment of the low non-object shift speed; and if a determination is made that there is a likelihood of exceeding the upper limit, a shift speed at which there is no likelihood of exceeding the upper limit is established, and if a determination is made that there is no likelihood of exceeding the upper limit, establishment of the low non-object shift speed is started, and after engagement of the non-object engagement device, if the rotational speed of the driving force source exceeds a determination threshold that is lower than the upper limit, a determination is made that there is an engagement failure in the object engagement device.

11. The control device for a vehicle drive apparatus according to claim 1, wherein the object shift speed is provided in plurality; and if a determination is made that there is an engagement failure in the object engagement device, a shift speed that is one of non-exceeding object shift speeds among the plurality of object shift speeds is established, when establishing a shift speed in the transmission device from the neutral state, the non-exceeding object shift speeds being the object shift speeds at which the rotational speed of the driving force source does not exceed an upper limit.

12. The vehicle drive apparatus according to claim 11, wherein if a determination is made that there is an engagement failure in the object engagement device, and if the rotational speed of the driving force source does not exceed the upper limit even upon establishment of a shift speed with a highest speed ratio among the plurality of object shift speeds, establishment of all the shift speeds is permitted, when establishing a shift speed in the transmission device from the neutral state.

13. The control device for a vehicle drive apparatus according to claim 12, wherein if a determination is not made as to whether there is an engagement failure in the object engagement device, before establishing a low non-object shift speed in the transmission device, the low non-object shift speed being a shift speed that has a lower speed ratio than the object shift speed and is established by engagement of at least the non-object engagement device, a determination is made as to whether there is a likelihood that the rotational speed of the driving force source exceeds the upper limit in response to establishment of the low non-object shift speed; and if a determination is made that there is a likelihood of exceeding the upper limit, a shift speed at which there is no likelihood of exceeding the upper limit is established, and if a determination is made that there is no likelihood of exceeding the upper limit, establishment of the low non-object shift speed is started, and after engagement of the non-object engagement device, if the rotational speed of the driving force source exceeds a determination threshold that is lower than the upper limit, a determination is made that there is an engagement failure in the object engagement device.

14. The control device for a vehicle drive apparatus according to claim 11, wherein if a determination is not made as to whether there is an engagement failure in the object engagement device, before establishing a low non-object shift speed in the transmission device, the low non-object shift speed being a shift speed that has a lower speed ratio than the object shift speed and is established by engagement of at least the non-object engagement device, a determination is made as to whether there is a likelihood that the rotational speed of the driving force source exceeds the upper limit in response to establishment of the low non-object shift speed; and if a determination is made that there is a likelihood of exceeding the upper limit, a shift speed at which there is no likelihood of exceeding the upper limit is established, and if a determination is made that there is no likelihood of exceeding the upper limit, establishment of the low non-object shift speed is started, and after engagement of the non-object engagement device, if the rotational speed of the driving force source exceeds a determination threshold that is lower than the upper limit, a determination is made that there is an engagement failure in the object engagement device.

15. The control device for a vehicle drive apparatus according to claim 1, wherein if a determination is not made as to whether there is an engagement failure in the object engagement device, before establishing a low non-object shift speed in the transmission device, the low non-object shift speed being a shift speed that has a lower speed ratio than the object shift speed and is established by engagement of at least the non-object engagement device, a determination is made as to whether there is a likelihood that the rotational speed of the driving force source exceeds the upper limit in response to establishment of the low non-object shift speed; and if a determination is made that there is a likelihood of exceeding the upper limit, a shift speed at which there is no likelihood of exceeding the upper limit is established, and if a determination is made that there is no likelihood of exceeding the upper limit, establishment of the low non-object shift speed is started, and after engagement of the non-object engagement device, if the rotational speed of the driving force source exceeds a determination threshold that is lower than the upper limit, a determination is made that there is an engagement failure in the object engagement device.

* * * * *